(12) United States Patent
Nakamura et al.

(10) Patent No.: US 7,320,510 B2
(45) Date of Patent: Jan. 22, 2008

(54) IMAGE PROCESSING METHOD AND IMAGE PROCESSING APPARATUS

(75) Inventors: Takashi Nakamura, Yokohama (JP); Akihiko Nakatani, Kawasaki (JP); Minako Kato, Kawasaki (JP); Rie Kajihara, Yokohama (JP); Naoki Sumi, Kawasaki (JP); Shigeyasu Nagoshi, Yokohama (JP); Makoto Torigoe, Setagaya-ku (JP); Okinori Tsuchiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 11/460,412

(22) Filed: Jul. 27, 2006

(65) Prior Publication Data

US 2007/0024656 A1    Feb. 1, 2007

(30) Foreign Application Priority Data

Jul. 28, 2005    (JP)    ............................. 2005-218725

(51) Int. Cl.
  *B41J 2/205*    (2006.01)
(52) U.S. Cl. ......................... 347/15; 358/1.2; 358/1.9; 358/520
(58) Field of Classification Search .................. 347/15; 358/1.2, 1.9, 520, 3.01, 3.02
See application file for complete search history.

(56) References Cited

U.S. PATENT DOCUMENTS 6,305,775 B1    10/2001  Otsuka
6,336,705 B1    1/2002   Torigoe
6,847,377 B2 *  1/2005   Kitahara et al. ............ 345/600
6,867,883 B1 *  3/2005   Cholewo et al. ............ 358/1.9
6,894,720 B2 *  5/2005   Zhang ..................... 348/222.1

FOREIGN PATENT DOCUMENTS

JP    10-016251 A    1/1998
JP    2000-198227 A  7/2000

\* cited by examiner

*Primary Examiner*—Lamson D. Nguyen
(74) *Attorney, Agent, or Firm*—Canon U.S.A., Inc. I.P. Division

(57) ABSTRACT

A high quality gray scale (monochrome) image in which influences of "recorded color deviation" and "color transition" are suppressed is formed even in the case of a slightly uneven discharge amount. When a gray scale (monochrome) mode is set, in the entire range of a luminance signal, density signals corresponding to achromatic dots and small chromatic dots respectively are generated based on the luminance signal so that the density signal corresponding to the achromatic dots has a greater value than that of the density signal corresponding to the small chromatic dots. Accordingly, even a slight "recorded color deviation" that occurs when the achromatic dots are recorded can be corrected by the small chromatic dots having a hue opposite to the direction of color deviation, and a high quality gray scale image in which influences of "recorded color deviation" and "color transition" are suppressed can be formed.

25 Claims, 11 Drawing Sheets

IMAGE PROCESSING METHOD AND IMAGE PROCESSING APPARATUS

BACKGROUND OF THE INVENTION

1. Field of the Invention

The present invention relates to an image processing method and an image processing apparatus for forming a high quality gray scale image.

2. Description of the Related Art

As an example of a recording apparatus that is capable of outputting a color image, there is an ink-jet recording apparatus having a plurality of color inks. When an image is formed by using subtractive color mixture as is the case with the ink-jet recording apparatus, three basic colors consisting of cyan (C), magenta (M), and yellow (Y) are generally used. Use of this combination of colors allows representation of not only hues of cyan, magenta and yellow but also various other hues. For example, red (R) can be represented by mixing magenta and yellow. By gradually changing the ratio of amounts of inks mixed together, colors over an entire color space can be substantially represented.

However, in practice, it is very difficult to find basic color materials (C, M, and Y) having colors located at ideal coordinates in the color space. Coordinates in the color space of respective color materials deviate more or less from their ideal coordinates, and the deviation varies depending on the type of a recording medium used. Further, when more ink is employed to increase the density of a color, the resultant locus in the color space does not necessarily linearly extend toward high color saturation, and the saturation tends to decrease with increasing amounts of ink in a range higher than a particular value of the density of the color. The deviation of the color of a recorded image from ideal coordinates in the color space can occur in many types of recording apparatuses including the ink-jet recording apparatus. Hereinafter, such a deviation will be referred to as a "recorded color deviation".

In a recording apparatus in which recorded color deviations can occur, recording data is corrected depending on the characteristics of inks and/or a recording medium such that a recorded color becomes as close to an ideal color as possible. However, of various hues to be represented, black and gray (achromatic colors) are difficult to adjust. In the gray scale, even a slight increase/decrease in amount of ink can result in a large change in hue perceptible by human eyes. Although black can be represented by mixing three basic colors, it is difficult to obtain black with a sufficiently high density even if maximum possible amounts of the three color inks are used. In recent ink-jet recording apparatuses, to avoid the difficulty described above, black ink is added to the three basic colors. In such an ink-jet recording apparatus, when a gray scale is represented, only the black ink is used or basic color inks are used together with the black ink. Japanese Patent Application Laid-Open No. 2000-198227 discusses the technique in which pigment ink is used for the black color while dye inks are used for the basic three colors in order to ensure the black color density.

FIG. 1 shows output values of respective color inks used to record a gray scale image in an ink-jet recording apparatus discussed in Japanese Patent Application Laid-Open No. 2000-198227. In FIG. 1, the horizontal axis represents values of a luminance signal varying from white (255) to black (0). As the luminance signal value is closer to 255 (white) at the left end, the output result becomes a lower density, while as the luminance signal value is closer to 0 (black) at the right end, the output result becomes a higher density. Accordingly, this horizontal axis represents a range equivalent to the entire density range (entire gradation range) from the lowest density to the highest density of a gray scale image to be actually output. Meanwhile, the vertical axis represents output density signal values (0 to 255) of respective ink colors to be output in response to respective luminance signal values. The output density signal value is any value in the range from 0 (white) representing the lowest density to 255 (black) representing the highest density. As can be seen from FIG. 1, in a low density range, three colors C, M, and Y are used to form a gray image. The output signal values of the three colors are different from one another to make the colors well balanced so as to prevent the "recorded color deviation". In FIG. 1, in the high density range, use of a black ink (K) is started, and in the highest density range (luminance signal=0), the output density signal value becomes around 128. In FIG. 1, it is assumed that pigment ink is used for the black ink. However, the shapes of the general output curve in the case to record a gray scale image are not limited to the shapes shown in FIG. 1. Use of the black ink may be started at a value greater or smaller than that in FIG. 1. Further, the output density signal value for black at the highest density (luminance signal value=0) may reach, for example, 255. The output density signal values for color inks need not be monotonically increased as shown in FIG. 1. The output density signal values for color inks may be gradually decreased after use of the black ink is started.

In recent ink-jet recording apparatuses, there is a demand for smooth and high calorimetric images that are comparable to silver halide photographs, and to cope with this demand, various techniques have been developed. In comparison with silver halide photographs, what has been most troublesome in the conventional ink-jet recording apparatuses is granularity of an output image that is perceptible to a user. Granularity refers to a visually perceptible rough texture that appears in an image due to ink dots used to record the image on a recording medium. In essence, images with visible granularity are considered low quality compared with silver halide photographs.

To reduce such granularity, many recent ink-jet recording apparatuses use a plurality of inks that are similar in color but different in density.

FIG. 2 shows output density signal values of respective ink colors employed by an ink-jet recording apparatus using a plurality of inks that are similar in color but different in density, in which output density signal values are plotted in a manner similar to that in FIG. 1. Herein, in addition to cyan (C), magenta (M), yellow (Y), and black (K), light cyan (LC) and light magenta (LM) with low color material density are used. As shown in FIG. 2, in the low density range, the gray scale image is formed using three colors of LC, LM and Y. In the process where density increases gradually from low density to high density, if the high-density inks are used, dots are formed sparsely and a visible granular texture appears. Therefore, low-density inks are used to avoid such granularity. When low-density inks are used, ink dots formed on a recording medium are not easily perceptible.

For the purpose to reduce granularity in similar manners, many ink-jet recording apparatuses have been proposed in which inks that are of the same color but different in discharge amount (dots that are of the same color but different in size) are used to form an image (for example, Japanese Patent Application Laid-Open No. 10-16251). For example, to reduce granularity, small cyan (SC) and small magenta (SM) are used instead of light cyan (LC) and light magenta (LM). These small cyan (SC) and small magenta (SM) are used in a manner similar to light cyan (LC) and light magenta (LM) shown in FIG. 2 so as to reduce granularity.

As shown in FIG. 2, in the middle density range, the output signal values of LM (or SM) and LC (or SC) become near their maximum values, and densities still higher than these values cannot be obtained by using any combination of these inks. On the other hand, since an image recorded on a recording medium is fully filled with many dots, granularity due to a single dot is not easily perceptible. Therefore, from this stage, inks of C, M, and further K are gradually added, and density can be increased while maintaining low granularity. At the same time, the output values of LC (or SM), LM (or SC), and Y are gradually decreased. Finally, the output value of K exceeds the output value of any other ink, and black of high density and a preferable hue can be represented.

In recent ink-jet recording apparatuses, there is a demand for image quality that are comparable to that of silver halide photographs, and this is also true of a gray scale image. The results of strenuous examinations by the present inventors to obtain a gray scale image at a level comparable to silver halide photographs have found that there are cases where "recorded color deviation" and "color transition" cannot be avoided by the conventional monochrome mode shown in FIG. 1 and FIG. 2. Namely, in recent years, ink droplets have been made smaller for high image quality, but when ink droplets are made small, variations in ink discharge amounts affect greatly upon image quality. Especially in a gray scale image, image quality deterioration due to variations in discharge amount is conspicuous, and in the conventional monochrome mode shown in FIG. 2, "recorded color deviation" occurs, deteriorating the gray balance to an extent that cannot be ignored. Further, the amount and the direction of recorded color deviation are uncontrollable, and the recorded color deviation can cause a phenomenon where an abrupt transition occurs in monotonic gradation changes and hue changes (hereinafter, referred to as "color transition"). Especially, as described with reference to FIG. 2, such a "color transition" tends to occur in a range in which dominant ink is switched from the low density range to the high density range.

As described above, the conventional monochrome mode as shown in FIG. 2 cannot suppress or reduce "recorded color deviation" and "color transition". Users typically dislike such "recorded color deviation" and "color transition" in a gray scale image. Therefore, it is indispensable to resolve the "recorded color deviation" and "color transition" problems to achieve a higher quality gray scale image.

SUMMARY OF THE INVENTION

The present invention has been made to solve the above-described problems, and accordingly, an aspect of the present invention is to provide an image processing method and an image processing apparatus capable of suppressing or reducing influences of "recorded color deviation" and "color transition" and of forming a high quality gray scale image.

According to an aspect of the present invention, there is provided an image processing method for generating density signals. The density signals correspond to at least achromatic dots and second kind chromatic dots. The second kind chromatic dots are in the same color as or a similar color to first kind chromatic dots and the second kind chromatic dots are a smaller size or a lower density than the first kind chromatic dots. The image processing method includes: performing image processing to generate at least density signals corresponding to the achromatic dots and the second kind chromatic dots respectively for forming a monochrome image. The density signals are generated based on a luminance signal corresponding to the monochrome image so that the density signal corresponding to the achromatic dots has a larger value than the density signal corresponding to the second kind chromatic dots in an entire range of the luminance signal.

According to another aspect of the present invention, there is provided an image processing method for generating density signals. The density signals correspond to at least achromatic dots, second kind chromatic dots, and fourth kind chromatic dots. The second kind chromatic dots are in the same color as or a similar color to first kind chromatic dots and the second kind chromatic dots have a smaller size or a lower density than the first kind chromatic dots. The fourth kind chromatic dots are in the same color as or a similar color to third kind chromatic dots and the fourth kind chromatic dots have a smaller size or a lower density than the third kind chromatic dots. The third kind chromatic dots have a color different from that of the first kind chromatic dots. The image processing method includes: performing image processing to generate at least density signals corresponding to the achromatic dots, the second kind chromatic dots, and the fourth kind chromatic dots respectively for forming a monochrome image. Performing image processing includes generating, based on a luminance signal corresponding to the monochrome image, the density signals so that the density signal corresponding to the achromatic dots has a larger value than the density signal corresponding to each of the second and fourth kind chromatic dots in an entire range of the luminance signal.

According to still another aspect of the present invention, there is provided an image processing method for generating density signals corresponding to at least achromatic dots, second kind chromatic dots, and third kind chromatic dots. The second kind chromatic dots are in the same color as or a similar color to first kind chromatic dots and the second kind chromatic dots have a smaller size or a lower density than the first kind chromatic dots. The third kind chromatic dots have a color different from that of the second kind chromatic dots. The image processing method includes: performing image processing to generate density signals corresponding to the achromatic dots, the second kind chromatic dots, and the third kind chromatic dots respectively for forming a monochrome image. The density signals are generated, based on a luminance signal corresponding to the monochrome image, so that the density signal corresponding to the achromatic dots has a larger value than the density signal corresponding to each of the second and third kind chromatic dots in an entire range of the luminance signal.

According to yet another aspect of the present invention, there is provided an image processing method for generating a signal for image formation performed in a recording apparatus capable of recording at least achromatic dots, first kind chromatic dots, second kind chromatic dots, and third kind chromatic dots, the second kind chromatic dots being in the same color as or a similar color to the first kind chromatic dots and the second kind chromatic dots having a smaller size or a lower density than the first kind chromatic dots, the third kind chromatic dots having a color different from that of the second kind chromatic dots. The image processing method includes specifying one of a first monochrome mode and a second monochrome mode to form an image in monochrome. When the first monochrome mode is specified, image processing is performed to generate at least density signals corresponding to the achromatic dots and the second kind chromatic dots respectively for forming a monochrome image, the density signals being generated, based a the luminance signal corresponding to the monochrome image, so that the density signal corresponding to the achromatic dots has a larger value than the density signal corresponding to the second kind chromatic dots in an entire range of the luminance signal. When the second monochrome mode is specified, image processing is performed to generate at least density signals corresponding to the achromatic dots and the third kind chromatic dots respectively for forming the monochrome image, the density signals being generated, based on a luminance signal corresponding to the monochrome image, so that the density signal corresponding to the achromatic dots has a larger value than the density signal corresponding to the third kind chromatic dots in the entire range of the luminance signal.

According to still another aspect of the present invention, there is provided an image processing method for generating a signal for image formation performed in a recording apparatus capable of recording at least achromatic dots, first kind chromatic dots, second kind chromatic dots, third kind chromatic dots, fourth kind chromatic dots, and fifth kind chromatic dots, the second kind chromatic dots being in the same color as or a similar color to the first kind chromatic dots and the second kind chromatic dots having a smaller size or a lower density than the first kind chromatic dots, the third kind chromatic dots having a color different from that of the first kind chromatic dots, the fourth kind chromatic dots being in the same color as or a similar color to the third kind chromatic dots and the fourth kind chromatic dots having a smaller size or a lower density than the third kind chromatic dots, the fifth kind chromatic dots having a color different from those of the first and third kind chromatic dots. The image processing method including specifying one of a first monochrome mode and a second monochrome mode to form an image in monochrome. When the first monochrome mode is specified, image processing is performed to generate at least density signals corresponding to the achromatic dots, the second kind chromatic dots, and the fourth kind chromatic dots respectively for forming a monochrome image, the density signals generated, based on a luminance signal corresponding to the monochrome image, so that the density signal corresponding to the achromatic dots has a larger value than the density signal corresponding to each of the second and fourth kind chromatic dots in an entire range of the luminance signal. When the second monochrome mode is specified, image processing is performed to generate at least density signals corresponding to the achromatic dots, the second kind chromatic dots, and the fifth kind chromatic dots respectively for forming the monochrome image, the density signals generated, based on the luminance signal of the monochrome image, so that the density signal corresponding to the achromatic dots has a larger value than the density signal corresponding to each of the second and fifth kind chromatic dots in the entire range of the luminance signal.

Furthermore, according to yet another aspect of the present invention, there is provided an image processing method for generating a signal for image formation performed in a recording apparatus capable of recording at least black dots, first cyan dots, second cyan dots, first magenta dots, second magenta dots, and yellow dots, the second cyan dots having a recording density lower than that of the first cyan dots, the second magenta dots having a recording density lower than that of the first magenta dots. The image processing method including: performing image processing to generate, based on a luminance signal corresponding to an image to be formed, at least density signals corresponding to the black dots and the second cyan dots respectively for forming a monochrome image, the density signals generated, based on a luminance signal corresponding to the monochrome image, so that the density signal corresponding to the black dots has a larger value than the density signal corresponding to the second cyan dots in an entire range of the luminance signal.

According to still another aspect of the present invention, there is provided an image processing method for generating a signal for image formation performed in a recording apparatus capable of recording at least black dots, first cyan dots, second cyan dots, first magenta dots, second magenta dots, and yellow dots, the second cyan dots having a recording density lower than that of the first cyan dots, the second magenta dots having a recording density lower than that of the first magenta dots. The image processing method including: performing image processing to generate density signals corresponding to the black dots, the second cyan dots, and the second magenta dots respectively for forming a monochrome image, the density signals generated, based on a luminance signal corresponding to the monochrome image, so that the density signal corresponding to the black dots has a larger value than the density signal corresponding to each of the second cyan dots and the second magenta dots in an entire range of the luminance signal.

According to still another aspect of the present invention, there is provided an image processing method for generating a signal for image formation performed in a recording apparatus capable of recording at least black dots, first cyan dots, second cyan dots, first magenta dots, second magenta dots, and yellow dots, the second cyan dots having a recording density lower than that of the first cyan dots, the second magenta dots having a recording density lower than that of the first magenta dots. The image processing method including: performing image processing to generate density signals corresponding to the black dots, the second cyan dots, and the yellow dots respectively for forming a monochrome image, the density signal generated, based on a luminance signal corresponding to the monochrome image, so that the density signal corresponding to the black dots has a larger value than the density signal corresponding to each of the second cyan dots and the yellow dots in an entire range of the luminance signal.

According to another aspect of the present invention, there is provided an image processing method for generating a signal for image formation performed in a recording apparatus capable of recording at least black dots, first cyan dots, second cyan dots, first magenta dots, second magenta dots, and yellow dots, the second cyan dots having a recording density lower than that of the first cyan dots, the second magenta dots having a recording density lower than that of the first magenta dots. The image processing method including: performing image processing to generate at least density signals corresponding to the black dots and the second magenta dots respectively for forming a monochrome image, the density signals generated, based on a luminance signal corresponding to the monochrome image, so that the density signal corresponding to the black dots has a larger value than the density signal corresponding to the second magenta dots in an entire range of the luminance signal.

According to still another aspect of the present invention, there is provided an image processing method for generating a signal for image formation performed in a recording apparatus capable of recording at least black dots, first cyan dots, second cyan dots, first magenta dots, second magenta dots, and yellow dots, the second cyan dots having a recording density lower than that of the first cyan dots, the second magenta dots having a recording density lower than that of the first magenta dots. The image processing method including: performing image processing to generate density signals corresponding to the black dots, the second magenta dots, and the yellow dots respectively for forming a monochrome image, the density signals generated, based on a luminance signal corresponding to the monochrome image, so that the density signal corresponding to the black dots has a larger value than the density signal corresponding to each of the second magenta dots and the yellow dots in an entire range of the luminance signal.

Still further, according to another aspect of the present invention, there is provided an image processing apparatus comprising an image processing unit configured to perform the image processing method.

According to the present invention, a slight "recorded color deviation" that occurs in recording achromatic color materials on a recording medium can be finely corrected, and a stable gray scale image in which "recorded color deviation" and "color transition" are suppressed or reduced in the entire density range (entire luminance range) can be represented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Exemplary embodiments of the invention will be described in detail below with reference to the drawings.

First Embodiment

Figure 3:
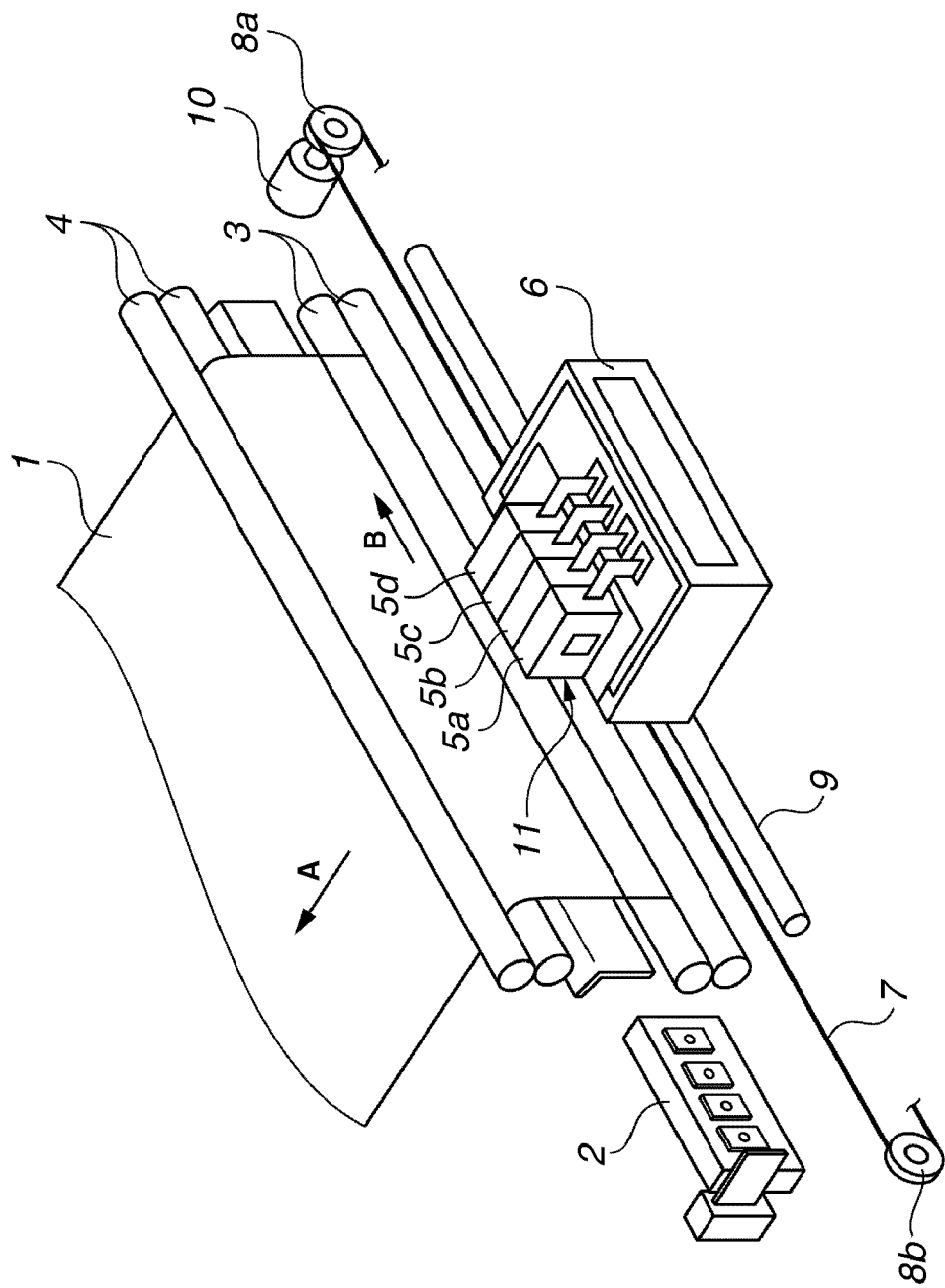
FIG. 3 is a diagram showing the internal structure of an ink-jet recording apparatus according to an exemplary embodiment of the present invention.

FIG. 3 is a diagram showing the internal structure of an ink-jet recording apparatus according to a first exemplary embodiment of the present invention. Reference number 1 denotes a recording medium such as a paper sheet or a plastic sheet. Before recording, a plurality of recording media 1 is placed in the form of a stack in a cassette (not shown) or the like, and when recording is started, the recording media 1 are fed one by one by a feed roller (not shown) into a main part of the recording apparatus. A first transport roller pair 3 and a second transport roller pair 4 are disposed at locations spaced apart by a specified distance as shown in FIG. 3. The first transport roller pair 3 and the second transport roller pair 4 are driven by respectively separate stepping motors (not shown) so that the recording medium 1 pinched by these roller pairs is transported in the direction shown by an arrow A at a specified rate.

Ink tanks 5a to 5d supply inks to an ink-jet recording head 11. The ink tank 5a stores black (k) ink, the ink tank 5b stores cyan, the ink tank 5c stores magenta, and the ink tank 5d stores yellow (Y) ink. The surface of discharge ports for discharging ink droplets from the recording head 11 is arranged to face the recording medium 1 held in a slightly tensioned manner between the first transport roller pair 3 and the second transport roller pair 4. The recording head 11 may be structured so that parts for discharging inks of four colors in total are formed separately or integrated in a single body.

The recording head 11 and the ink tank 5 are removably mounted onto a carriage 6. A carriage motor 10 drives the carriage 6 via two pulleys 8a, 8b and a belt 7 so that the carriage 6 reciprocates in the direction shown by a narrow B. The scanning direction of the carriage 6 is guided by a guide shaft 9.

A recovery unit 2 maintains the recording head 11. The recording head 11 can move to a home position where the recovery unit 2 is disposed, and the recovery unit 2 can perform a recovery process to remove residual ink blocking the discharge ports of the recording head 11.

In the recording operation, the carriage 6 moves in the direction shown by the arrow B at a specified speed, and ink droplets are discharged from the recording head 11 at appropriate timing in accordance with image data. When one time of scanning by the recording head 11 is completed, the transfer roller pairs 3 and 4 transport the recording medium 1 in the direction shown by the arrow A by a specified distance. The scanning by the recording head 11 and moving the recording medium 1 are alternately performed so as to form an image on the recording medium 1 one after another. The direction shown by the arrow A as the transport direction of the recording medium is perpendicular to the direction B shown by the arrow B as the scanning direction of the head.

Figure 4:
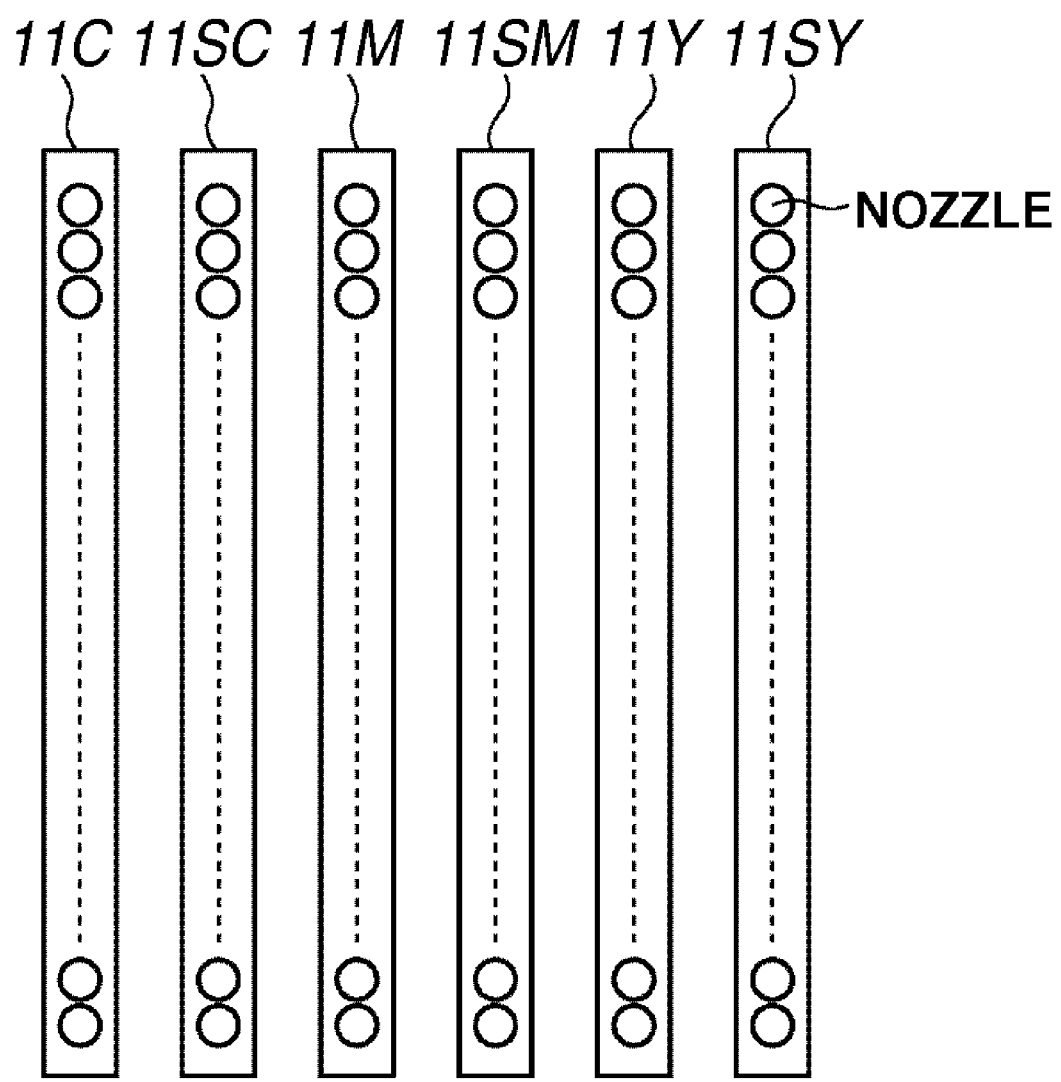
FIG. 4 illustrates an array of discharge ports of a recording head.

FIG. 4 illustrates an array of discharge ports of the recording head 11. Line arrays of discharge ports for discharging inks of respective color inks are arranged as shown in FIG. 4 in the same order as that in which color inks are stored in the ink tanks 5 (order of KCMY) in the direction of the arrow B, which is the scanning direction of the carriage 6. In FIG. 4, the array of black discharge ports for discharging black ink supplied from the ink tank 5a is not shown. At the right side to the array of black ink discharge ports (not shown), a large cyan ink discharge port array 11C for discharging large droplets of cyan ink supplied from the ink tank 5b and a small cyan ink discharge port array 11SC for discharging small droplets of cyan ink are arranged. The dot size (or dot diameter) recorded by the large cyan ink discharge port array 11C is larger than the dot size (or dot diameter) recorded by the small cyan ink discharge port array 11SC. Further, at the right side of the small cyan ink discharge port array 11SC, a large magenta ink discharge port array 11M for discharging large droplets of magenta ink supplied from the ink tank 5c and a small magenta ink discharge port array 11SM for discharging small droplets of magenta ink are arranged. The dot size (or dot diameter) recorded by the large magenta ink discharge port array 11M is larger than the dot size (or dot diameter) recorded by the small magenta ink discharge array 11SM. Further, at the right side of the small magenta ink discharge port array 11SM, a large yellow ink discharge port array 11Y for discharging large droplets of yellow ink supplied from the ink tank 5c and a small yellow ink discharge port array 11SY for discharging small droplets of yellow ink are arranged. At a pitch of approximately 42 μm, 512 discharge ports for discharging each color ink are arranged along the same direction as the recording medium transport direction. Accordingly, each time the recording head 11 scans the recording medium 1 once, an image with a resolution of for example 600 dpi (dot per inch; reference value) and a height of approximately 21.6 mm is formed on the recording medium.

In the present embodiment, it is assumed that an ink droplet of about 1 nanogram (ng) is discharged from each discharge port of the small cyan ink discharge port array 11SC, the small magenta ink discharge port 11SM, and the small yellow ink discharge port array 11SY. On the other hand, it is assumed that an ink droplet of about 5 ng is discharged from each discharge port of the large cyan ink discharge port array 11C, the large magenta ink discharge port 11M, and the large yellow ink discharge port array 11Y. Further, it is assumed that an ink droplet of about 5 ng is discharged from each discharge port of the black (K) ink discharge port array.

Meanwhile, the discharge amount of chromatic inks of small droplets applicable in the present invention is not necessarily 1 ng or below, but it is preferable the discharge amount is 1 ng or below. The value of 1 ng in the present embodiment is "the value at which, when each dot of small cyan (SC) and small magenta (SM) is recorded sparsely on a recording medium, granularity of each dot of small cyan (SC) and small magenta (SM) is not substantially perceptible at the distance of distinct view, and in "toning", by each dot of small cyan (SC) and small magenta (SM), the change of L* in CIE-L*a*b* space is as small as negligible by a measuring apparatus, and the value that changes on a*b* plane realizes the minimum value perceptible by the measuring apparatus". Herein, the measuring apparatus is, for example, a spectral photometer "Spectrolino" by Gretag Macbeth. In the present embodiment, it is assumed that the ink dominantly used in recording a gray scale image is K, and inks used for "toning" are SC and SM.

Figure 5:
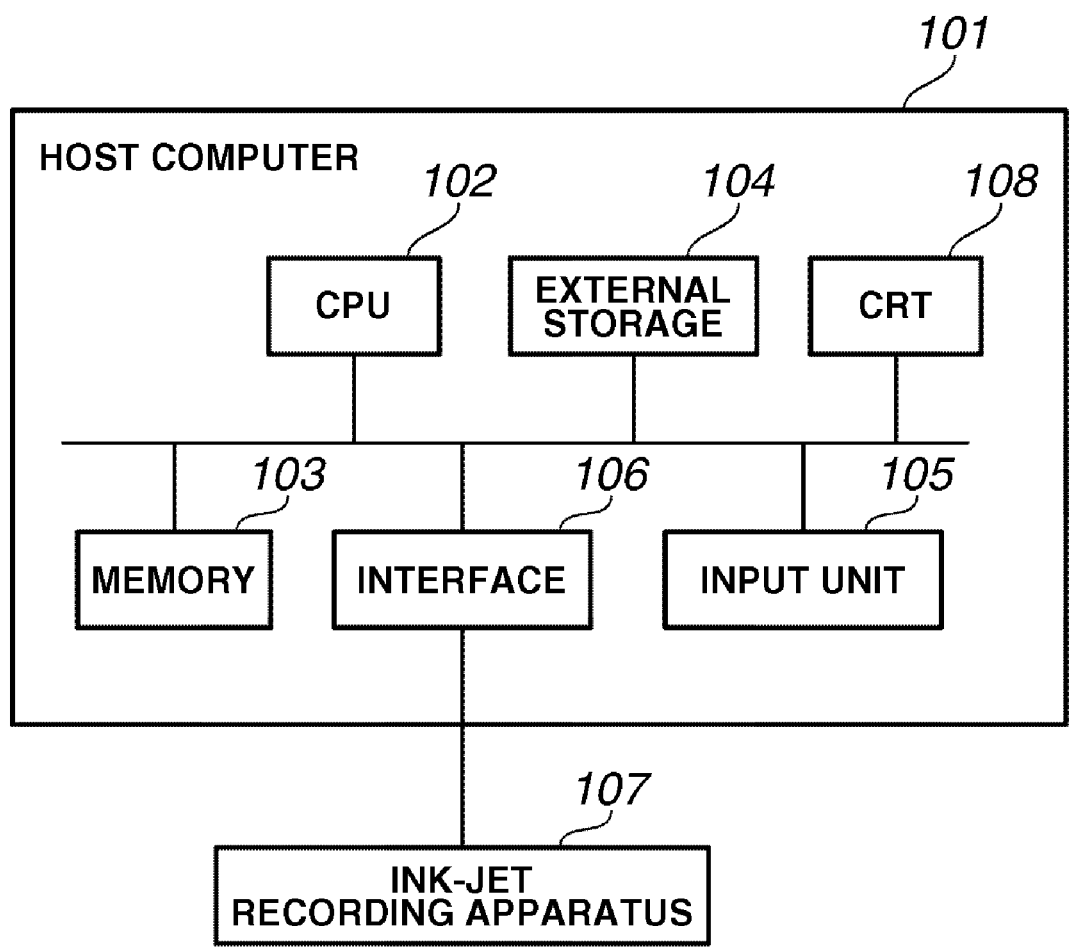
FIG. 5 is a block diagram illustrating an image processing apparatus according to an exemplary embodiment of the present invention.

FIG. 5 is a block diagram illustrating an image processing apparatus according to the present embodiment. A host computer 101 includes a central processing unit (CPU) 102, a memory 103, an external storage unit 104, an input unit 105, a display, for example, a cathode ray tube (CRT) 108, an interface 106, and the like.

The CPU 102 performs various processes including image data conversion and recording to be described later by executing a program stored in the external storage unit 104. The memory 103 is used as a work area in the conversion process and also used as a storage area to temporarily store image data. The program of processes such as image data conversion may be supplied to the host computer 101 from an external apparatus not shown therein. A user inputs various commands via the input unit 105 while checking information on the CRT 108.

The host computer 101 is connected to an ink-jet recording apparatus 107 via the interface 106, and the CPU 102 transmits image data after the conversion process to the ink-jet recording apparatus 107. The ink-jet recording apparatus 107 performs recording in accordance with the received image data.

Figure 6:
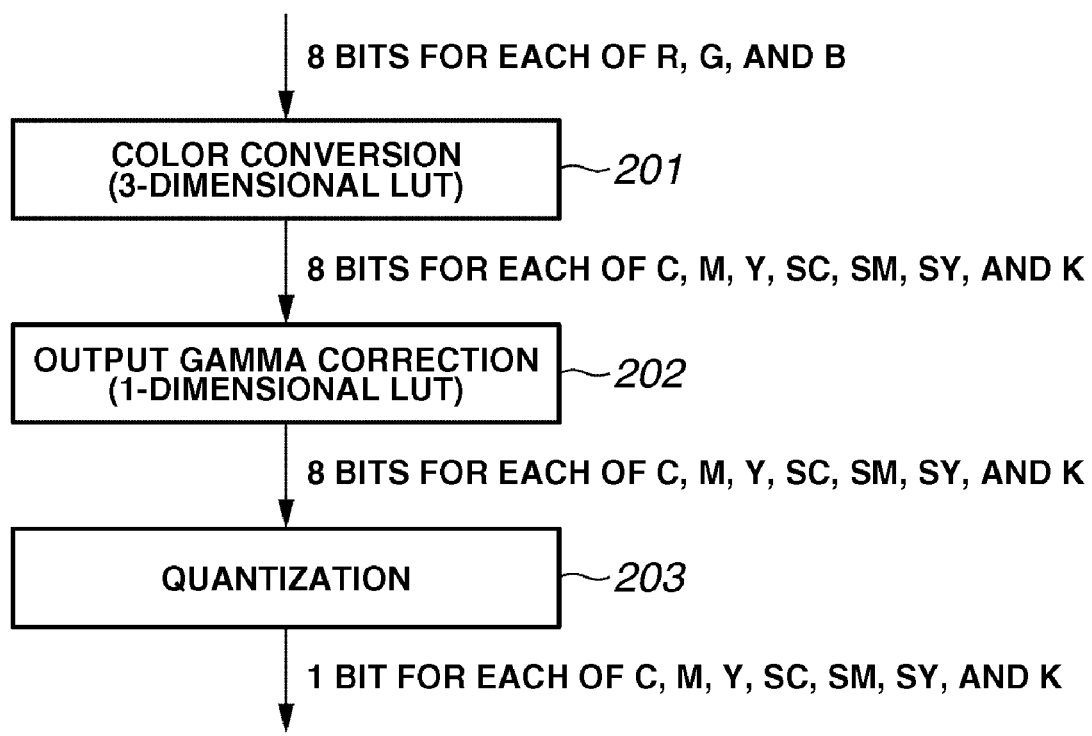
FIG. 6 is a block diagram illustrating an image data conversion process.

FIG. 6 is a block diagram illustrating the conversion process of image data that the CPU 102 of the present embodiment performs. In the present embodiment, 8-bit (256-level) image data represented by red (R), green (G), and blue (B) luminance signals is converted into 1-bit data corresponding to respective inks in a form that can be finally handled by the ink-jet recording apparatus 107. The 8-bit data of RGB is converted into 1-bit data of cyan (C), magenta (M), yellow (Y), small cyan (SC), small magenta (SM), small yellow (SY), and black (K).

The 8-bit R, G, and B luminance signals are first input to a color conversion unit 201 and converted into density signals of C, M, Y, SC, SM, SY and K. In this color conversion process, a 3-dimensional color conversion lookup table (LUT) is used. More specifically, the CPU 102 refers to the lookup table and determines density signal values of C, M, Y, SC, SM, SY and K corresponding to an input combination of R, G, and B signal values. The lookup table does not have density signal values for all signal levels of R, G, and B signals but has only density signal values for particular discrete sets of R, G, and B signal values. Therefore, the lookup table cannot be applied directly to all possible combinations of R, G, and B signal levels each taking one of 256 levels. In the present embodiment, for combinations of R, G, and B signal levels that are not described in the lookup table, density signal values are determined by means of interpolation using a plurality of data corresponding to a plurality of combinations of R, G, and B signal levels. Interpolation used herein is well known in the art, and the detailed description thereof is omitted. The density signal values obtained via the color conversion unit 201 are expressed in 8 bits as with the input values, that is, the luminance signal values, and output as density data each having one of 256 signal levels.

After the color conversion process is performed by the color conversion unit 201, the image data is subjected to a conversion process performed by an output gamma correction unit 202. The output gamma correction unit 202 corrects the input luminance signals of respective ink colors so that the optical density finally represented on a recording medium of each color has a linear relationship with the input density signal of an input density signal. In this process, the conversion is performed according to a 1-dimensional lookup table prepared independently for each color. The resultant signals output from the output gamma correction unit 202 are expressed in 8 bits as with the input values.

The 8-bit density data output from the output gamma correction unit 202 is supplied to a quantization unit 203. In the quantization unit 203, 8-bit data of C, M, Y, SC, SM, SY, and K is converted into 1-bit data of C, M, Y, SC, SM, SY, and K. Therefore, the density at each pixel on the recording medium is represented on two levels of whether to record each ink droplet according to ink kind used. If an area with a particular size including a plurality of pixels is viewed macroscopically, the color density for that area is the number of pixels recorded with ink droplets. This method of representing the density is called an area coverage modulation method, and in a recording apparatus using the area coverage modulation method, quantization is required to convert multilevel data into 2-level data as with the present embodiment. There are some quantization methods, and well known error diffusion or dithering may be used. After the image data is quantized by the quantization unit 203, the resultant 1-bit image data of each color is transferred to the ink-jet recording apparatus 107.

The above-described processes performed by the color conversion unit 201, the output gamma correction unit 202, and the quantization unit 203 are optimized depending on the type of a recording medium used and/or the type of an image formed on the recording medium. In particular, the lookup tables used in the color conversion unit 201 and the output gamma correction unit 202 are generally prepared for each recording medium type.

Figure 7:
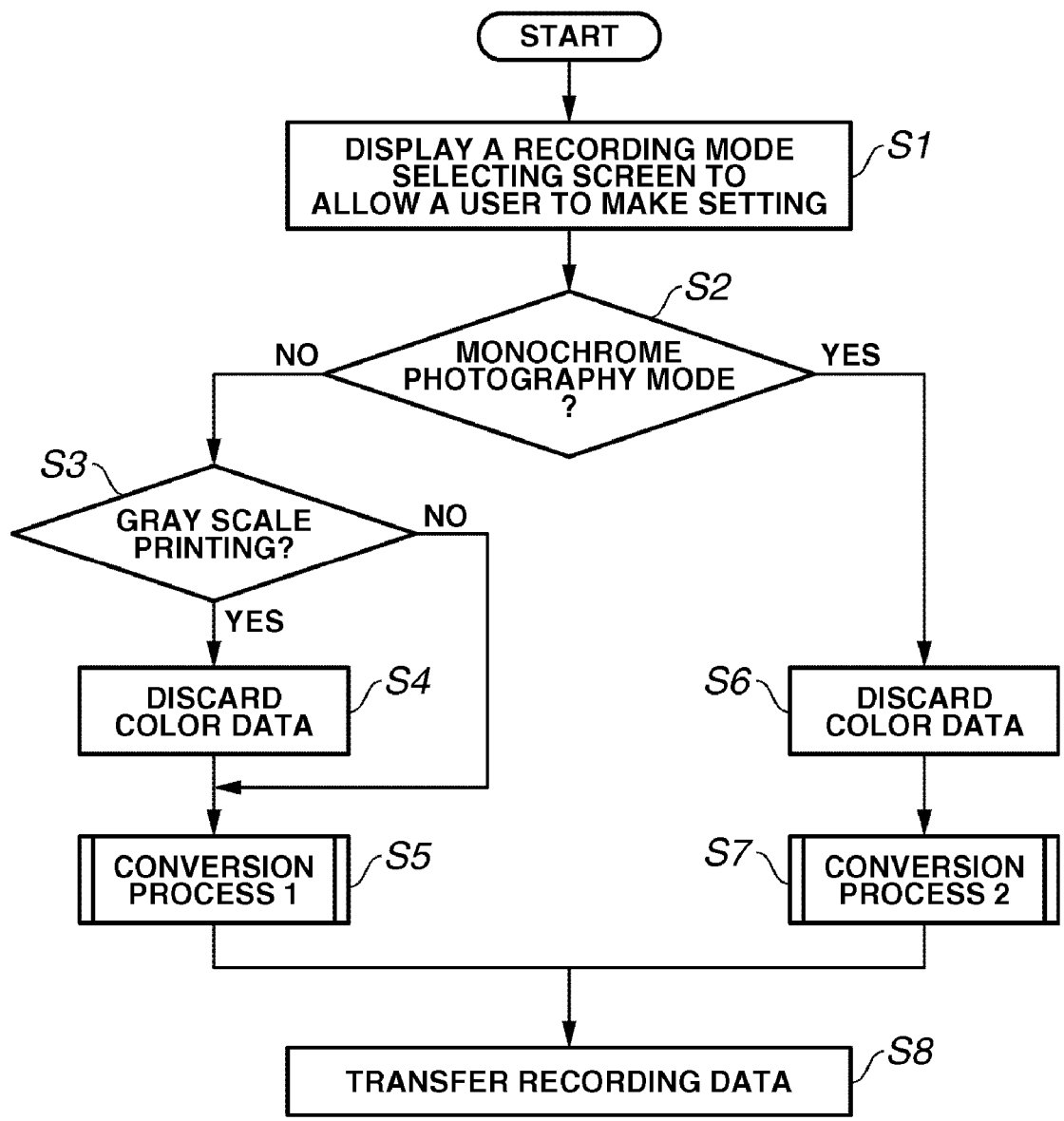
FIG. 7 is a flow chart of a pre-process performed by a recording apparatus in response to a record start command, before a recording process is actually started.

FIG. 7 is a flow chart of a pre-process performed by a recording apparatus in response to a record start command, before a recording process is actually started. In response to the start recording command issued by the user, the CPU 102 displays a recording mode selecting screen on the CRT 108 (step Si).

Figure 8:
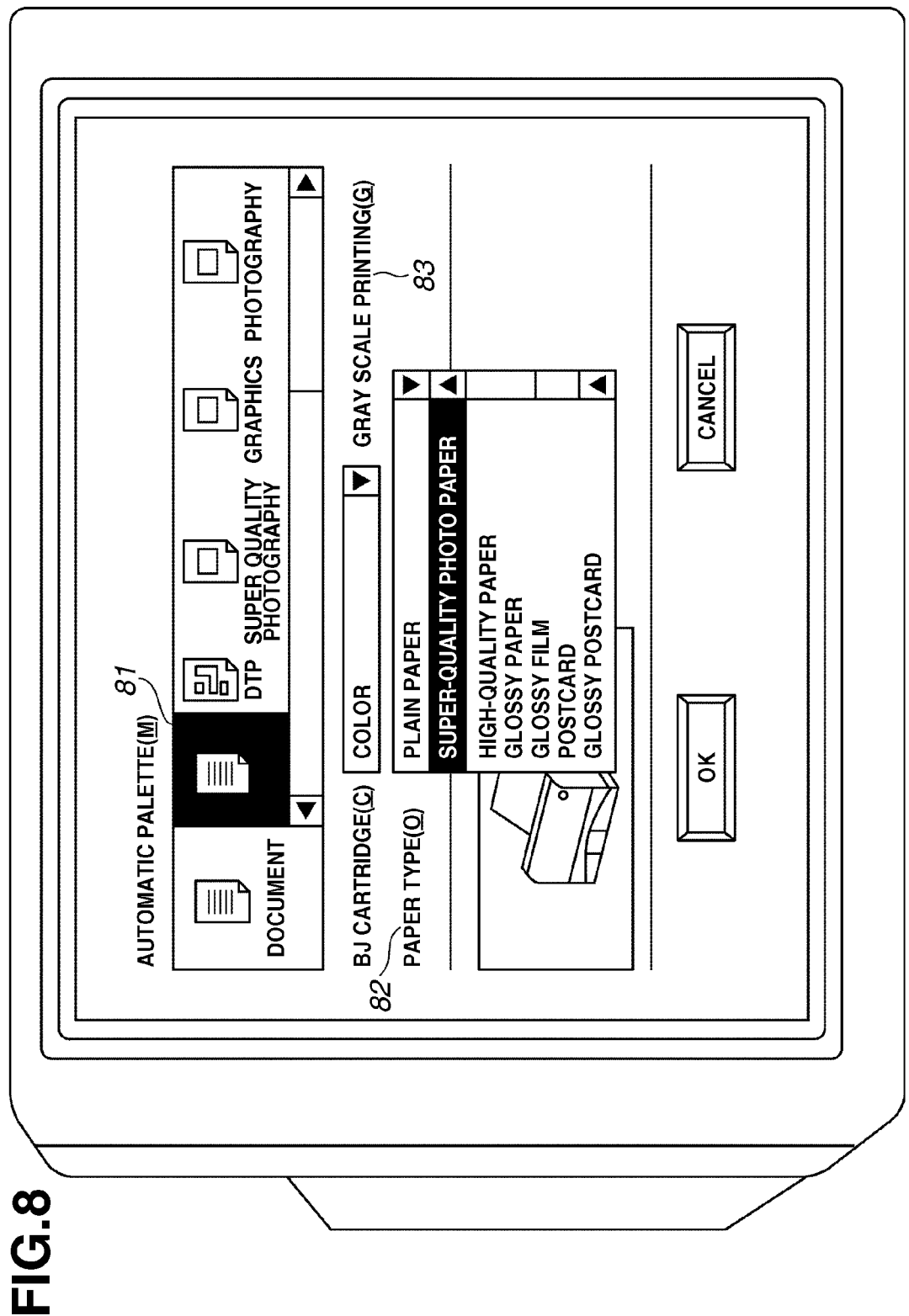
FIG. 8 is a diagram showing an example of the screen displayed on a cathode-ray tube (CRT) when a recording mode is set.

FIG. 8 illustrates an example of the screen displayed in step S1 on the CRT 108. In general, an ink-jet recording apparatus can handle several types of recording media, and a recording method most suitable for the type of a recording medium used is selected from a plurality of available methods. The switching of the recording method is performed by setting a specified recording mode, and the details of the recording method are set by the user by inputting data specifying recording conditions while viewing a screen such as the one shown in FIG. 8. In the present embodiment, the user specifies the type of an image (document, photography, or the like) to be recorded via an automatic palette 81. Further, the type of a recording medium on which to record an image is selected via a paper type selection list box 82. Furthermore, a gray scale printing check box 83 is used to specify whether to record a desired image in the gray scale printing mode.

Referring back to FIG. 7, in step S2, it is determined whether the specified recording mode is a monochrome mode (herein, especially, a monochrome photograph mode). Note that in the present embodiment, the term "monochrome mode" does not refer to all of the recording modes that are applied when gray scale printing is selected using the check box 83, but it refers to a recording mode that is applied when a monochrome photograph is output. Therefore, in the present embodiment, the term "monochrome mode" will herein be referred to as the "monochrome photograph mode". This "monochrome photograph mode" is applied only when the gray scale printing is selected by checking the check box 83 and, further, super-quality photo paper is selected in the paper type selection list box 82.

Figure 9:
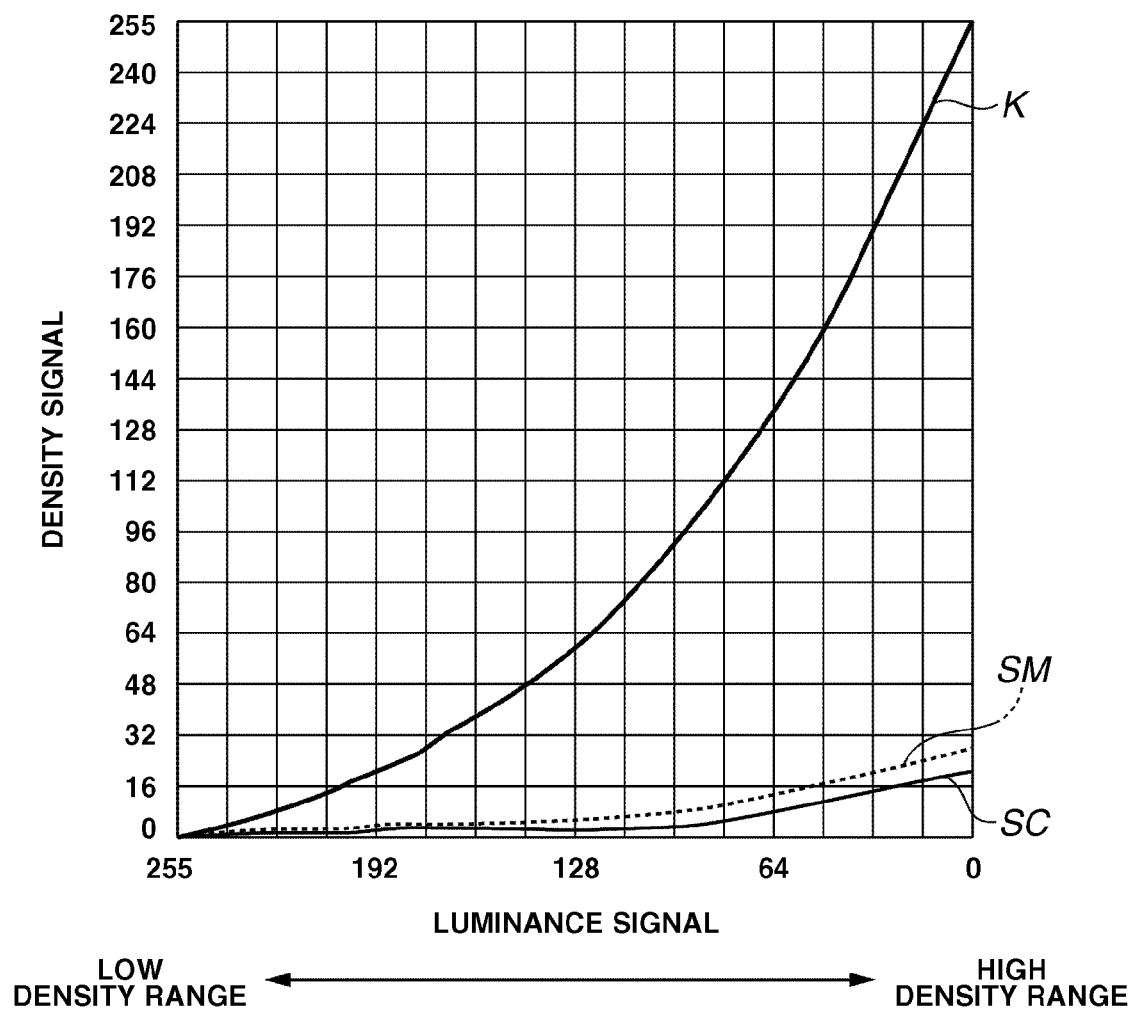
FIG. 9 is a diagram illustrating an example of a color conversion process according to an exemplary embodiment of the present invention.

In the case when it is determined in step S2 that the monochrome photograph mode is selected, the process proceeds to step S6, where RGB color information is discarded. More specifically, the RGB image signal is converted into a gray tone (R=G=B) luminance signal. If the achromatic luminance signal value is denoted by L, the conversion can be achieved, for example, by substituting R, G, and B signal values into a conversion formula L=0.3R+ 0.6G+0.1B. Thereafter, in step S7, the conversion process 2 peculiar to the monochrome photograph mode is performed. In the conversion process 2 in the monochrome photograph mode, image processing is performed so that a gray scale image is recorded in a combination of inks, as will be described later with reference to FIG. 9, in accordance with a color conversion table dedicated to the monochrome photograph mode. In this conversion process 2, multilevel density signals of respective ink colors including black are produced so that more black ink is used than the other color inks over the entire density range including the low density range and the high density range. Especially in the color conversion process 2 of the present embodiment, as shown in FIG. 9, black K is used dominantly in the entire density range, and small cyan SC and small magenta SM are used for "toning". Note that the conversion process 2 includes the image data conversion process described previously with reference to FIG. 6.

On the other hand, in step S2, if it is determined that the specified recording mode is not the monochrome photograph mode, the process proceeds to step S3. In step S3, it is determined whether the check box 83 was checked in step S1 to specify gray scale printing. If the check box 83 is checked, the process proceeds to step S4, where the RGB image signal is converted into a gray tone (R=G=B) luminance signal. Thereafter, the process proceeds to step S5. On the other hand, if the check box 83 is not checked for gray scale printing, the process proceeds directly to step S5.

Figure 11:
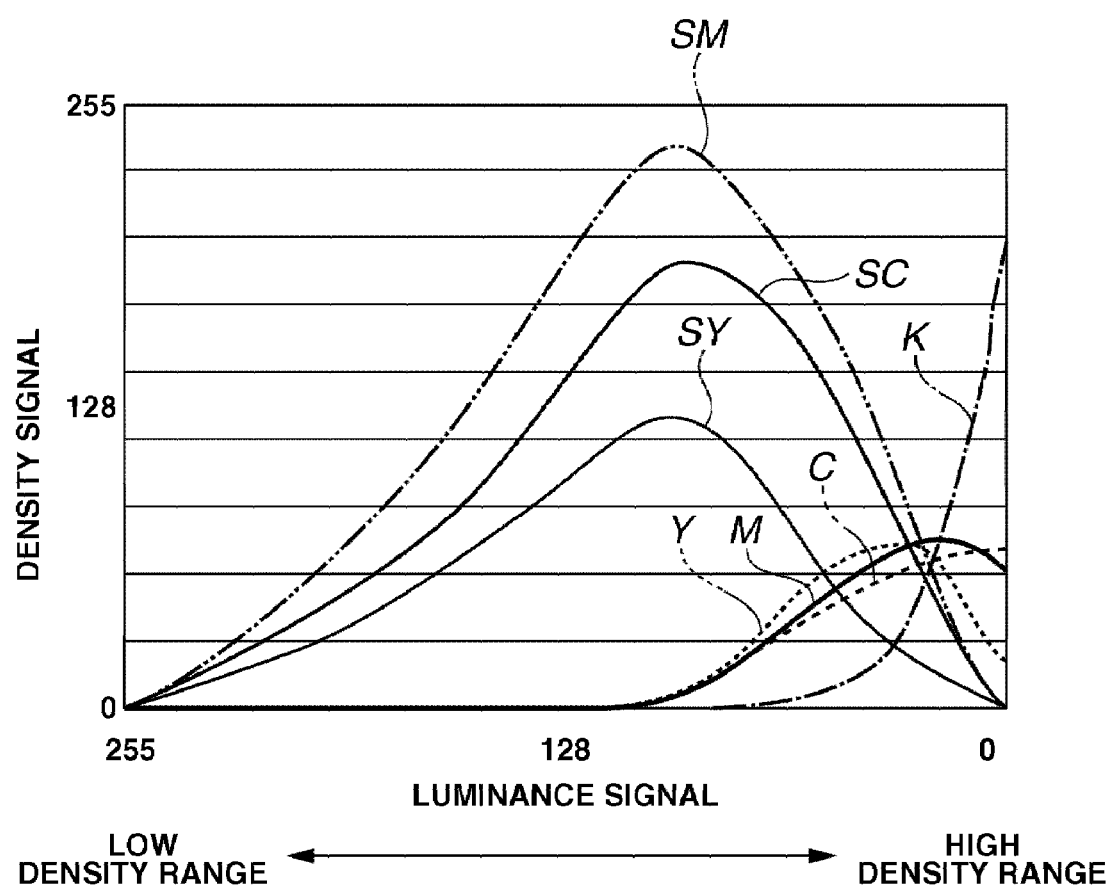
FIG. 11 is a diagram illustrating an example of a color conversion process according to an exemplary embodiment of the present invention.

In step S5, a conversion process 1 is performed on the image data. As with the conversion process 2, the conversion process 1 also includes an image conversion process, but the details thereof are different from those of the conversion process 2. More specifically, in the case when the process has proceeded directly to step S5 without proceeding via the step S4, the conversion process 1 in step S5 is performed so that multilevel density signals corresponding to respective color inks to be used to record a color image are produced based on a color conversion table that has been known in the art. On the other hand, in the case when the process has proceeded to step S5 via step S4, the conversion process 1 in step S5 is performed so that multilevel density signals of respective ink colors for use in recording a gray scale image are produced as shown in FIG. 11. According to FIG. 11, like the conventional color conversion table shown in FIG. 2, only color dots of low recording density are used in the low density range to the middle density range, and color dots of high recording density and black dots are additionally used in the middle density range to the high density range. More specifically, in the low density range to the middle density range, only small color dots SC, SM, and SY are used to form an image, and in the middle density range to the high density range, large color dots C, M, Y and black dots K are additionally used to form an image.

After the image data is subjected to the conversion process in step S5 or step S7, the resultant image data in the form of 2-level data is transferred to the ink-jet recording apparatus (step S8).

In the present embodiment, as described previously, the monochrome photograph mode is applied only when super-quality photo paper is selected as a recording medium. Therefore, in the conversion process 2 in step S7, a conversion method optimized for super-quality photo paper is employed. On the other hand, in the conversion process 1 performed in step S5 after it is determined that the mode is not the monochrome photograph mode, an optimum conversion method is selected depending on the type of a recording medium. More specifically, in the conversion process 1, depending on the type of a recording medium other than super-quality photo paper, a suitable lookup table is selected from a plurality of prepared lookup tables, and the color conversion and the output gamma correction are performed using a conversion method corresponding to each recording medium. Herein, in order to compare the monochrome photo mode and other modes, explanations have been made with the structure of branching into two modes as shown in FIG. 7.

FIG. 9 is a diagram illustrating the color conversion process in the conversion process 2. A horizontal axis represents values of a luminance signal varying from white (255) to black (0). As the luminance signal value is closer to 255 (white) at the left end, the output result becomes a lower density, while as the luminance signal value is closer to 0 (black) at the right end, the output result becomes a higher density. This means that the horizontal axis represents a range equivalent to the entire density range (entire gray level range) from the lowest density to the highest density of a gray scale image to be actually output. A vertical axis represents density signal values from 0 (white) representing the lowest density to 255 (black) representing the highest density of respective ink colors to be output in accordance with respective luminance signals values. As the density signal value becomes higher, the amount of black ink applied to unit area increases.

An advantage of the present embodiment is that the color conversion in the monochrome photograph mode is performed as described with reference to FIG. 9. On the other hand, in the conversion process 1, the color conversion is performed in a similar manner to the conventional color mode or monochrome mode (refer to FIG. 2). In particular, when a gray scale image is recorded, the color conversion process similar to the conventional color conversion process shown in FIG. 2, more specifically, the color conversion process as shown in FIG. 11 is performed.

Figure 1:
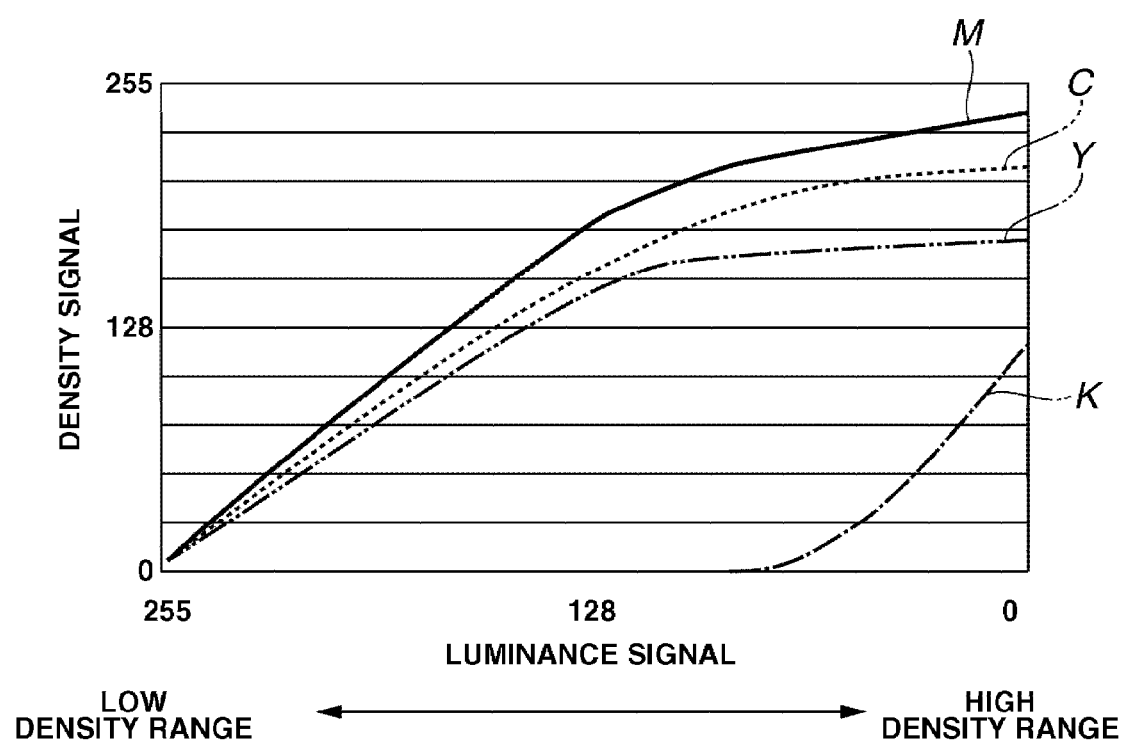
FIG. 1 is a diagram showing output values of inks in the case to record a gray scale image by using four color inks.
Figure 2:
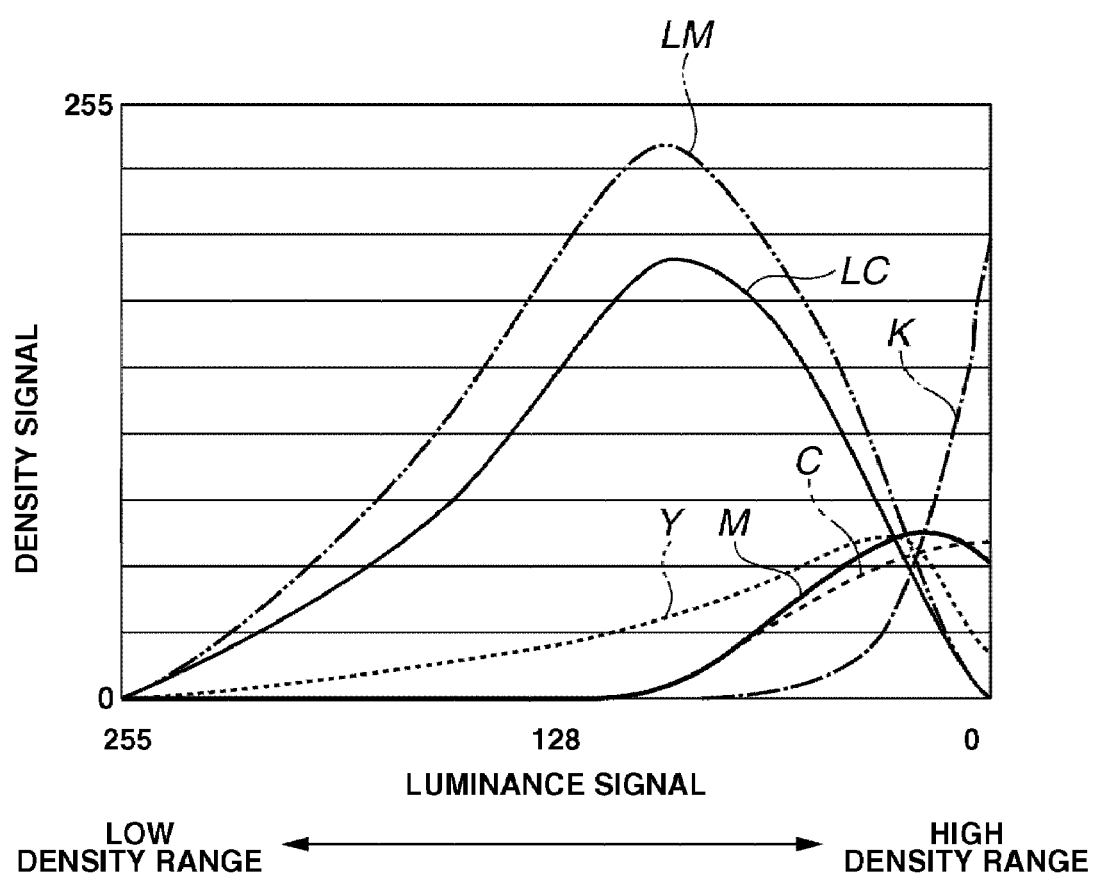
FIG. 2 is a diagram showing output values of inks in the case to record a gray scale image by using six color inks.

In the conventional monochrome mode, as can be seen from FIG. 2, the change in signal values is not monotonical, and intersecting among different colors occurs at several points. This can cause color transition to occur, as described earlier in the section of Description of the Related Art. In particular, when a recording head that discharges a small amount of ink droplet is used as is the case with the present embodiment, a significant color transition tends to occur more frequently, which brings about a serious problem in forming a high-quality monotone image such as a monochrome photographic image.

In contrast, in the color conversion according to FIG. 9, the density value of black is always greater than other ink colors and changes monotonically in a highlight range in which the density is low and in a high density range in which the density is high. That is, black ink is always dominant. Therefore, "color transition" that occurs in the process where a dominant ink transits is unlikely to occur. Meanwhile, as black herein, a curve for a gamma value of 1.8 is shown as an example. However, the gamma value is not limited to 1.8.

In FIG. 9, chromatic inks to be used together with black ink that is used dominantly are only two colors of small cyan and small magenta. The output signals for these two chromatic inks are set lower than the output signal for black ink. In the present embodiment, these two chromatic colors are used to compensate for "recorded color deviation". As described previously, it is difficult to represent achromatic gray by the basic colors of cyan, magenta and yellow, and further, even if black is used to represent an achromatic color, in some kinds of recording media, "recorded color deviation" can occur frequently. In the present embodiment, in order to correct a slight "recorded color deviation" that occurs when black ink is used to record on super-quality photo paper, chromatic colors of small cyan and small magenta are used. An advantage of the present embodiment is the use of smaller amounts of chromatic inks than that of black to compensate for "recorded color deviation" of black ink as the dominant color. Thus, a high-quality monochrome photographic image, the tone of which is close to an ideal achromatic color, can be provided.

Especially, in the present embodiment, as chromatic dots for "toning", small dots (herein, SC and SM) are used. Therefore, it is possible to correct "recorded color deviation" in higher precision than the case where only large dots (for example, C and M) are used. This is described in more detail hereinafter. When "toning" is performed using only chromatic large dots (for example C and M), the influence of one chromatic dot is too large. Therefore, it is difficult to adjust the color of a gray scale image to a desired color. When a desired color is to be reproduced in a*b* plane in a uniform color space such as CIE-L*a*b space, if only with large dots, it is difficult to finely adjust the value to one representing a desired color. On the other hand, in the above-described present embodiment, small dots whose influence upon color is relatively small are used. Therefore, it is possible to finely adjust the color of a gray scale image to a desired color, while finely correcting "recorded color deviation".

Further, chromatic small dots (herein, SC and SM) are used for "toning". Therefore, small dots themselves are unlikely to be perceptible, and image deterioration hardly occurs due to added small dots. That is, in an ink-jet recording apparatus, ink discharging position deviation occurs frequently. Accordingly, a problem may occur where discharging deviation occurs in chromatic dots, and added chromatic dots do not overlap black dots. However, even if such a problem occurs, because added chromatic dots are small dots, chromatic dots themselves where the discharging deviation has occurred is hardly perceptible, and image deterioration is not caused.

These chromatic inks are recorded when black is recorded even in a low density range. However, they do not have a role to reduce granularity, or a role as the basic colors that take balance and form gray. Therefore, even though the density value changes, the output curve only increases monotonically. The signal values of chromatic dots (SC and SM) for "toning" do not intersect the signal value of black (K) as the dominant color, and there is hardly a fear that "color transition" occurs as in the conventional monochrome mode described with reference to FIG. 2.

As described earlier, use of black ink positively in the highlight range as in the present embodiment may cause granularity. However, in the situation in which the amount of ink droplet used for each dot is so small that granularity of recorded dots when viewed from a distance is small as in the present embodiment, the problem may be with color transition and not with granularity. The present inventors have noted that in recording a high quality photographic image, the significance of "granularity" and "color transition" varies depending on the amount of ink droplet. That is, when the size of dots recorded on a recording medium is small and granularity is not a problem, "color transition" can be suppressed rather than suppressing granularity.

The size and the perceptibility of granularity of dots formed on a recording medium depend on color and other characteristics of the recording medium. Therefore, for a given amount of ink droplet, it is difficult to determine whether granularity is a problem, unless the type of a recording medium used is taken into consideration. However, in general, for widely used ink-jet recording apparatuses and for widely used recording media, it is desirable that the amount of ink droplet per dot be equal to or less than 5 ng, and, more desirably, equal to or less than 2 ng. However, the present invention is not limited to the ink discharge amount of 5 ng or below (modified example).

In the example described above, only in the case when an image to be output is supposed to be a photograph, that is, only in the case when "monochrome photograph mode" is selected, the color conversion process (conversion process 2) peculiar to the present embodiment is performed. However, the present embodiment is not limited to this example. Even if an image to be output is other than a photographic image, when the gray scale printing mode is selected, the conversion process 2 may be performed. That is, the present embodiment may be applied regardless of whether an image to be recorded is a photograph, and the conversion process 2 may be performed whenever the monochrome mode is selected to output an image in gray scale. This makes it possible to suppress the effects of "recorded color deviation" and "color transition" for monochrome photographic images and for any image in gray scale.

MODIFIED EXAMPLE 1

Figure 10:
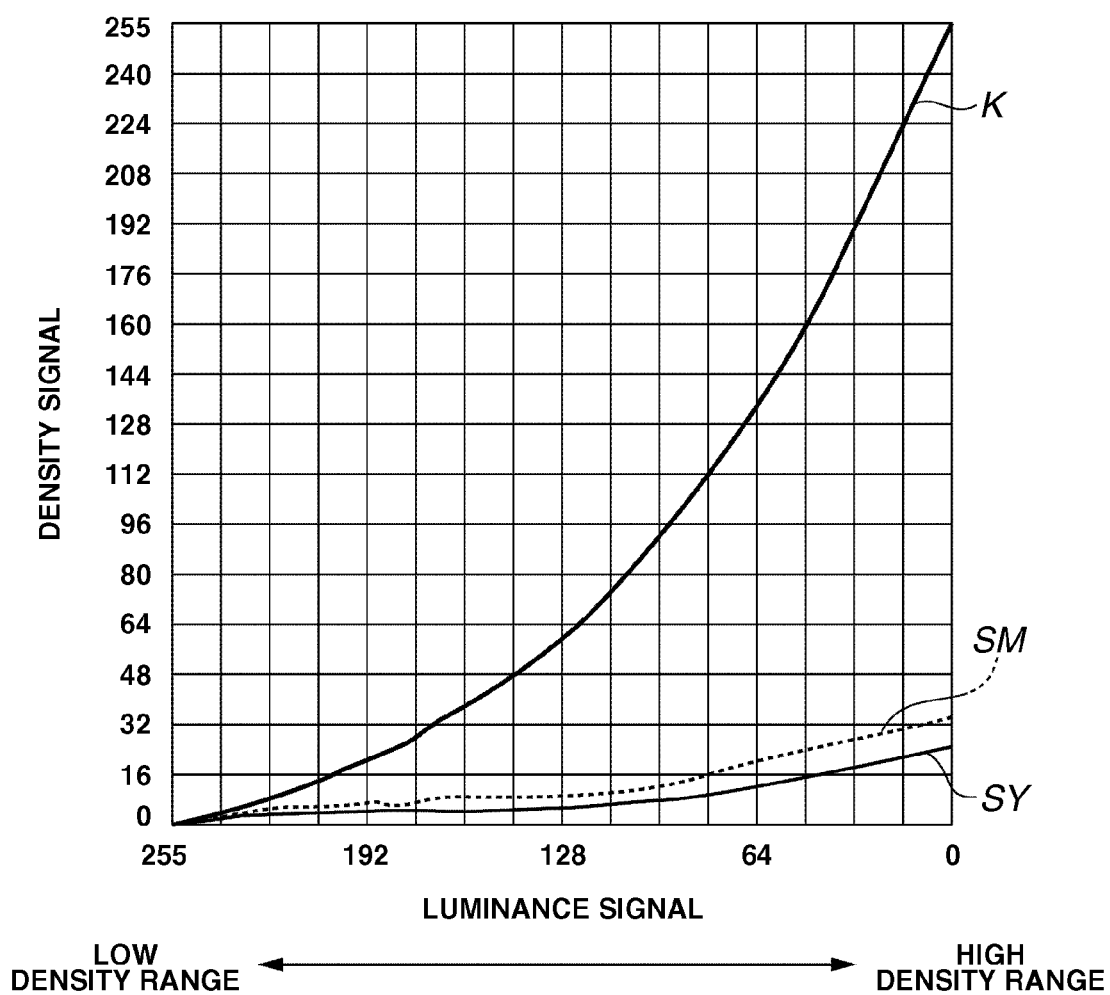
FIG. 10 is a diagram illustrating an example of a color conversion process according to an exemplary embodiment of the present invention.

In the example described above, small cyan (SC) and small magenta (SM) are used as chromatic inks to correct the "recorded color deviation" in the monochrome mode as described above with reference to FIG. 9. However, the present embodiment is not limited to this example. Other chromatic colors used for correction and the curves of chromatic colors may be properly defined depending on the type of a recording medium and the like. For example, when an image is recorded on a particular type of recording medium using only black ink, if the color tone of the resultant image is at a point deviating toward cyan, then small yellow (SY) and small magenta (SM) may be used as chromatic colors for correction as shown in FIG. 10. In another example, a combination of small cyan (SC) and small yellow (SY) may be used. In another example, any one of three color small dots (SC, SM, and SY) may be used, or all three color small dots (SC, SM, and SY) may be used.

Further, in the present embodiment, as chromatic dots used for correction, in the place of small dots, dots of light ink whose density is light may be used. Herein, suppose the case where chromatic dots usable in a recording apparatus are cyan (C), magenta (M), yellow (Y) and light cyan (Lc), light magenta (Lm), and light yellow (Ly). In this case, as chromatic dots used for correction, it is preferable that one or more of three light inks (Lc, Lm, and Ly) is combined. For example, black used dominantly may be toned using light cyan (Lc) and light magenta (Lm). Even when dots of light inks (for example, Lc, Lm, Ly, and the like) are used as chromatic inks used for correction of the "recorded color deviation", it is possible to obtain an effect similar to that in the above embodiment using small dots.

Furthermore, the present embodiment is effective also in a structure where, in addition to the above seven colors (CMYKScSmSy or CMYKLcLmLy), new inks such as red (R), green (G), and blue (B) are used simultaneously for correcting black.

Moreover, the kinds of inks for correction are not limited to two colors, but one color or three colors or more may be used.

In any way, the present embodiment includes the following configuration. At least one chromatic ink containing a color component used to cancel out a particular color saturation that occurs when an image is recorded on a desired recording medium using a black ink is selected, and the density of the selected chromatic ink is set to be lower than the density of black ink over the entire density range in gray scale.

As described above, in the present embodiment, when the monochrome mode is selected, image processing is performed so that a black ink and at least one chromatic ink (for example, small cyan) are used over the entire density range including the low density range and the high density range, so that the amount of the black ink is dominant compared with the other color inks so as to suppress the effects of the "recorded color deviation" and "color transition". Particularly, in the present embodiment, dots of low recording density such as small dots and light dots are used as "chromatic ink dots" for toning. Therefore, high precision correction can be achieved.

Second Embodiment

A second embodiment is described next. Herein, similar parts to the first embodiment are not described, and the following description is focused on the difference from the first embodiment.

In the second embodiment, the color conversion process (conversion process 2) according to the present invention is performed in a plurality of monochrome modes in which different types of chromatic inks are used together with an achromatic ink. More specifically, the plurality of monochrome modes includes a first monochrome mode in which a gray scale image is output using a black ink, a small cyan ink, and a small magenta ink as shown in FIG. 9, and a second monochrome mode in which a gray scale image is output using a black ink, a small yellow ink, and a small magenta ink as shown in FIG. 10.

The reason for having such a plurality of monochrome modes is because the desirable gray tone depends on specific users. The provision of the plurality of monochrome modes makes it possible to handle a difference in user preference in terms of desirable gray tone. When a first gray scale image is recorded on a recording medium in the first monochrome mode and a second gray scale image is recorded on the same type recording medium (for example, plain paper) in the second monochrome mode, some users evaluate the first gray scale image, but other users evaluate otherwise. For example, in the first monochrome mode, a greater amount of cyan ink is used than in the second monochrome mode, and thus the first gray scale image gives users a cold impression compared with the second gray scale image. Users who like such a tone select the first gray scale image. On the other hand, in the second monochrome mode, a greater amount of yellow ink is used than in the first monochrome mode, and thus the second gray scale image gives users a warm impression compared with the first gray scale image. Users who like such a tone select the second gray scale image. Thus, by providing the plurality of monochrome modes in which different types of chromatic inks are added to the achromatic ink in recording a gray scale image, a wide variety of user preferences can be processed.

Now, herein, with reference to FIG. 7, a processing flow according to the present embodiment is described briefly. The processing flow according to the present embodiment is similar to that according to the first embodiment described earlier with reference to FIG. 7, except for some steps (steps S1, S2, and S7). Thus, the following description is focused on these different steps.

First, in step S1, a user makes setting associated with the monochrome mode via the driver screen displayed on the CRT 108 of the host computer. In the present embodiment, the driver screen includes two types of check boxes for selecting gray scale printing, that is, "first gray scale printing" and "second gray scale printing". The user can select any one of these two types of check boxes. For example, if the user likes a cold gray tone image rather than a warm gray tone image, the user may select the first monochrome mode in which a resultant image tends to have a cold tone. On the other hand, if the user likes the warm gray tone rather than the cold gray tone, the user may select the second monochromatic mode in which a resultant image tends to have a warm tone.

In step S2, it is determined whether the selected recording mode is the monochrome mode such as the first or second monochrome mode. In the present embodiment, the monochrome mode is applied when the check box 83 is checked to select the "first gray scale printing mode" or the "second gray scale printing mode".

In a case where it is determined in S2 that the monochrome mode is selected, the process proceeds to step S7 via step S6 to perform the conversion process 2 peculiar to the monochrome mode. Herein, the conversion process 2 in step S7 for monochrome photograph images includes a conversion process 2A and a conversion process 2B. If the first monochrome mode was selected in step S2, the conversion process 2A is performed, on the other hand, if the second monochrome mode was selected in step S2, the conversion process 2B is performed.

In the conversion process 2A, image processing is performed according to a first monochrome mode color conversion table to produce density data for use in recording a gray scale image using a combination of inks as shown in FIG. 9. More specifically, multilevel density signals of respective ink colors consisting of black, small cyan, and small magenta are produced so that more black ink is used than the other color inks over the entire density range including the low density range and the high density range. On the other hand, in the conversion process 2B, image processing is performed according to a second monochrome mode color conversion table to produce density data for use in recording a gray scale image using a combination of inks as shown in FIG. 10. More specifically, multilevel density signals of respective ink colors consisting of black, small yellow, and small magenta are produced so that more black ink is used than the other color inks over the entire density range including the low density range and the high density range.

The present embodiment has been described above with reference to the specific example where small cyan and small magenta are used as chromatic inks used and small yellow and small magenta are used in the first and second monochrome modes. However, the combinations of chromatic inks are not limited to those, but, for example, one type of chromatic ink may be used or other combinations of two types of chromatic inks may be used.

Further, two or more monochrome modes may be provided. For example, a third monochrome mode may be added in which an achromatic color (black) ink, a small cyan ink, and a small yellow ink are used. In another example, an additional monochrome mode may be added in which a color conversion table is used that is similar to the color version table for use in the conversion process 1 shown in FIG. 7, and a similar combination of inks to that shown in FIG. 11 is used.

According to the present embodiment, the color conversion process (conversion process 2) includes a plurality of monochrome modes that are different in terms of the types of chromatic inks used together with the achromatic ink. Thus, gray scale images with different tones can be recorded. This provides, in addition to advantages similar to the advantages achieved by the first embodiment, the ability to handle a wide variety of user preferences.

Third Embodiment

A third embodiment of the present invention is described next. Herein, similar parts to the first embodiment are not described, and the following description is focused on the difference from the first embodiment.

In this third embodiment, a plurality of monochrome modes is provided in which different types of chromatic inks are used together with an achromatic ink, and one of these monochrome modes is selected depending on the type of a recording medium used. More specifically, a first monochrome mode is selected when a first type of recording medium (for example, super-quality photo paper) is used, while a second monochrome mode is selected when a second type of recording medium (for example, high-quality photo paper). Herein, the first monochrome mode is the mode in which a gray scale image is output using a black ink, a small cyan ink, and a small magenta ink as shown in FIG. 9, and the second monochrome mode is the mode in which a gray scale image is output using a black ink, a small yellow ink, and a small magenta ink as shown in FIG. 10.

The advantages obtained by providing the plurality of monochrome modes depending on the type of a recording medium are described next. The white color of many recording media varies depending on the type of a recording media. If a gray scale image is recorded on different types of recording media using the same combination of inks, the resultant gray scale images are different in tone. There is a need for obtaining a gray scale image with similar tone when the image is recorded on a recording medium designed to record a photographic image, regardless of the type of the recording medium as long as it is designed to record a photographic image. To meet such a need for obtaining a gray scale image with a similar tone, the present embodiment provides monochrome modes (the first monochrome mode and the second monochrome mode) depending on the type of recording media (super-quality photo paper and high-quality photo paper).

With reference to FIG. 7, a processing flow according to the present embodiment is described briefly. The processing flow according to the present embodiment is similar to the flow chart of FIG. 7, except for some steps (steps S2 and S7). Therefore, the following description is focused on those different steps.

In step S2, it is determined whether the selected recording mode is the monochrome mode. In the present embodiment, the monochrome mode is applied when the gray scale printing is selected by checking the check box 83 and super-quality photo paper or high-quality photo paper is selected in the paper type selection list box 82. More specifically, the "first monochrome mode" is applied when the gray scale printing is selected by checking the check box 83 and super-quality photo paper is selected in the paper type selection list box 82, while the "second monochrome mode" is applied when the gray scale printing is selected by checking the check box 83 and high-quality photo paper is selected in the paper type selection list box 82.

In the case where it is determined in step S2 that the monochrome mode is selected, the process proceeds to step S7 via step S6 to perform the conversion process 2 peculiar to the monochrome mode. Herein, the conversion process 2 in step S7 for monochrome photograph includes a conversion process 2A and a conversion process 2B. If the first monochrome mode was selected in step S2, the conversion process 2A is performed. On the other hand, if the second monochrome mode was selected in step S2, the conversion process 2B is performed.

In the conversion process 2A, image processing is performed according to a first monochrome mode color conversion table to record a gray scale image using a combination of inks as shown in FIG. 9. More specifically, multilevel density signals of respective ink colors consisting of black, small cyan, and small magenta are produced so that more black ink is used than the other color inks over the entire density range including the low density range and the high density range. And a gray scale image is recorded on super-quality photo paper based on multilevel density signals thus generated. On the other hand, in the conversion process 2B, image processing is performed according to a second monochrome mode color conversion table to record a gray scale image using a combination of inks as shown in FIG. 10. More specifically, multilevel density signals of respective ink colors consisting of black, small yellow, and small magenta are produced so that more black ink is used than the other color inks over the entire density range including the low density range and the high density range. And a gray scale image is recorded on high-quality photo paper based on multilevel density signals thus generated.

A similar tone is obtained in both the gray scale image recorded on the super-quality photo paper and the gray scale image recorded on high-quality photo paper. Accordingly, it is possible to satisfy the need for obtaining a gray scale image with a similar tone when the image is recorded on a recording medium designed to record a photographic image, regardless of the type of the recording medium as long as it is designed to record a photographic image.

The present embodiment provides two types of monochrome modes depending on whether a recording medium used is super-quality photo paper or high-quality photo paper. However, the present embodiment is not limited to this example. For example, in addition, the present embodiment may provide a third monochrome mode for use in recording a gray scale image on another type of recording medium other than super-quality photo paper and high-quality photo paper. In such a case, chromatic inks to be used together with an achromatic ink may be selected so that a recorded gray scale image has a similar tone to that recorded on super-quality photo paper and high-quality photo paper.

In the present embodiment, as described above, the color conversion process (conversion process 2) according to the present embodiment is performed in a plurality of monochrome modes that are different in terms of the types of chromatic inks used together with an achromatic ink, and one of the plurality of monochrome modes is selected depending on the type of a recording medium used. This enables obtaining a gray scale image with a similar tone, at least for any of particular types of recording media.

Fourth Embodiment

In the first through third embodiments described above, when a monochrome photographic image is output, image processing is performed so that an achromatic ink (for example, a black ink) and chromatic inks (for example, small cyan, small magenta, small yellow, and the like) are used over the entire density range including the low density range and the high density range (the entire luminance signal range) as shown in FIG. 9 and FIG. 10, and so that the amount of the achromatic ink is dominant compared with the chromatic inks. However, the chromatic inks are not necessarily to be used over the entire density range, but they may be used in a particular part of the density range.

Therefore, in the present embodiment, the color conversion process (conversion process 2) in the monochrome mode is performed so that chromatic inks are used in a particular part of the luminance signal range (in a particular part of the density range). However, as in the first to third embodiments, the achromatic ink is dominantly used compared with the chromatic inks in any part of the luminance signal range.

Next, cases in which the present embodiment is applied effectively are described below.

Strictly, the achromatic color refers to a color located at a point with $a^*=b^*=0$ in the $a^*b^*$ plane of the CIE-$L^*a^*b^*$ space. However, in practice, most achromatic inks used in ink-jet recording apparatuses are not located at the point with $a^*=b^*=0$. That is, $a^*\neq 0$ and $b^*\neq 0$, and thus achromatic inks have a slight chromatic color component. Such a slight chromatic color component is not visibly perceptible when dots are sparsely recorded. However, when dots are recorded densely, the chromatic color component becomes visibly perceptible. In this situation, use of chromatic inks in the highlight range is not desirable, and it is sufficient to use the chromatic inks in the middle density range and the high density range. In view of the above, in the present embodiment, image processing is performed so that the chromatic inks are used in the middle density range and the high density range, and so that a greater amount of achromatic ink is used than the chromatic inks in the middle density range and the high density range. Further, as a chromatic ink, at least one of a small cyan (SC) ink, a small magenta (SM) ink, a small yellow (SY) ink is used. According to the present embodiment, it is possible to reduce the amount of chromatic inks used, while suppressing the "recorded color deviation" in gray line. Furthermore, in the same manner as in the above first to third embodiments, "small dots" are used for correcting the "recorded color deviation". Therefore, it is possible to perform a fine correction compared with using "large dots".

Fifth Embodiment

In the first to fourth embodiments described above, when a monochrome photograph is output, image processing is performed so that an achromatic ink and small droplets of chromatic inks are used as shown in FIG. 9 and FIG. 10. The image processing is performed so that the achromatic ink is used dominantly compared with the chromatic inks on the entire density range. However, the small droplets of chromatic inks are not necessarily to be used over the entire density range, but large droplets of chromatic inks may be used in a particular part of the density range.

Therefore, in the present embodiment, the color conversion process (conversion process 2) in the monochrome mode is performed so that "large color dots" (for example, cyan C, magenta M, yellow Y) are used in a particular part of the luminance signal range (in a particular part of the density range). More specifically, only small color dots are used for toning in the low density range and the middle density range, and small color dots and large color dots are used together for toning in the middle density range and the high density range. However, the achromatic ink is used dominantly compared with the chromatic inks, in the same manners as in the first to fourth embodiments.

Next, cases in which the present embodiment is applied effectively are described below.

When "toning" is performed in the high density range, a desired color cannot be attained by using only "small dots" in many cases. That is, achromatic ink (black ink) discharged much in the high density range. Therefore, even when toning is performed by using chromatic color small dots, it is difficult to adjust a black image to a desired color. In such a case, it is not effective to perform toning by using only small dots of chromatic colors in the high density range.

On the other hand, because a sufficient amount of achromatic ink has been discharged already in the high density range, granularity is hardly perceptible, but "recorded color deviation" and "color transition" may not be desirable for viewing. Therefore, it is effective to reproduce nearly a desired color by use of "large dots" in the high density range, and to perform a finer color adjustment by use of "small dots". Then, it is possible to realize a desired color at high speed and at high precision.

Sixth Embodiment

In the fifth embodiment, in the monochrome mode, small color dots are used over the entire range of luminance signals, while large color dots are used in a particular part of the luminance signal range. However, the case in which small color dots and large color dots are used together for toning is not limited to the above-described fifth embodiment.

As described previously, color deviation of achromatic ink is hardly perceptible in the low density range. Accordingly, chromatic inks (small color dots) are not used in the low density range. On the other hand, color deviation of achromatic ink is perceptible in the high density range. Accordingly, chromatic inks are used in the high density range. Further, small color dots and large color dots are used together as chromatic inks used in the high density range.

Thus, in the present embodiment, small color dots and large color dots are used together in a particular part of the luminance signal range (in a particular part of the density range).

Seventh Embodiment

In the above-described embodiment, in addition to cyan dots and magenta dots, with regard to yellow dots, a plurality of dots that are different in terms of recording density are used. More specifically, a case in which yellow dots of different sizes (large and small yellow dots, or large, medium, and small yellow dots) are used, and a case in which yellow dots of different color densities (dark and light yellow dots, or dark, medium, and light yellow dots) are used, have been described. However, yellow dots are of high brightness and hardly perceptible, the effect of arranging a plurality of dots of different recording densities is low compared with other colors. Accordingly, there may be a case in which only one kind of yellow dot is used. The present embodiment may be applied to such a case in which only one kind of yellow dot is used.

In the present embodiment, when the monochrome mode is set, a black ink is used dominantly and a combination of small cyan dots and yellow dots, or a combination of small magenta dots and yellow dots is used for toning.

For example, as shown in FIG. 10, when the monochrome mode using magenta and yellow for toning is performed, small magenta dots are used for magenta, and a single kind of yellow dots are used for yellow. In this case, the size of yellow dots is not specifically limited. For example, it may be the same size as that of small magenta, or the same size as that of large magenta, or may be an intermediate size between them. This is true also in the case to using small cyan dots and yellow dots for toning.

According to the present embodiment, it is possible to reduce the type of yellow color ink used, while suppressing the recorded color deviation due to black ink.

OTHER EMBODIMENTS

In the above-described embodiments, two kinds of a large dot and a small dot (for example, C and SC) are used as chromatic color dots that are the same in color but different in size, the number of kinds of dot diameter applicable in the present invention is not limited to two kinds. For example, three kinds of large dot (large C), medium dot (medium C), and small dot (small C) or more kinds may be used.

Dots that are the same in color but different in size have different recording densities. Accordingly, "dots that are the same in color but different in size" may refer to "dots that are the same in color but different in recording density".

Further, in the same manner, in the above embodiments, two kinds of a dark ink and a light ink (for example, C and LC) are used as chromatic inks that are similar in color but different in density. However, the number of kinds of dark and light inks applicable in the present invention is not limited to two kinds. For example, three kinds of a dark ink (dark C), a medium ink (medium C), and a light ink (light C) or more kinds may be used.

These dark and light dots that are similar in color but different in density have different recording densities. Accordingly, "dark and light dots that are similar in color" may refer to "dots that are similar in color but different in recording density".

Thus, the present invention may be applied to any case using chromatic dots that are the same or similar in color but different in recording density. Especially, at least dots (small dots or light dots) of relatively low recording density are used as chromatic color dots for "toning" in the monochrome mode.

It is not essential for chromatic color dots (small dots or light dots) of relatively low recording density to be used over the entire range from the low density range to the high density range as shown in FIG. 9 and FIG. 10. Although it depends on characteristics of an achromatic ink (black), chromatic inks may not be used in the low density range where color deviation of an achromatic ink is not so perceptible, while chromatic inks may be used in the high density range where color deviation of an achromatic ink is perceptible.

In the case where two kinds or more of chromatic dots for toning are used, density ranges applicable for those kinds may be varied. For example, when small magenta dots and small yellow dots are used as shown in FIG. 10, small magenta dots are used in the entire range from the low density range to the high density range, while small yellow dots are not used in the low density range but used in the high density range.

In the embodiments described above, an ink-jet recording apparatus shown in FIG. 5 is used. However, in the present invention, the type of the ink-jet recording apparatus is not limited to this. One or more parts shown in FIG. 5 may be disposed in either the host computer 101 or the ink-jet recording apparatus 107, or all parts may be disposed in a single apparatus.

Further, in the embodiments described above, all of the conversion process described with reference to FIG. 6 is performed by the CPU 102 of the host computer 107. However, a part or all of the conversion process may be performed by the ink-jet recording apparatus 107. Inputting of data specifying the recording mode and setting associated with the specified recording mode described above with reference to FIG. 7 may be performed by the ink-jet recording apparatus 107.

Furthermore, the details of the recording mode setting screen are not limited to those shown in FIG. 8. In the example shown in FIG. 8, the recording mode setting screen includes the check box 83 for specifying the gray scale printing. The check box 83 is not necessarily needed. For example, the setting screen may be configured so that a user may set the hue and the color saturation of an image to be recorded, and the gray scale mode may be applied when the specified hue and the color saturation fall within a particular range.

In the embodiments described above, the invention is applied to an ink-jet recording apparatus capable of discharging seven color inks. However, the present invention is not limited to such an ink-jet recording apparatus, but the present invention may be applied to a wide variety of recording apparatus capable of recording a color image using a plurality of color materials. However, the "recorded color deviation", "color transition", and "granularity" are problems specific to ink-jet recording apparatuses, and thus the present invention is useful in particular when it is applied to ink-jet recording apparatuses. A wide variety of methods are known to discharge ink droplets from an ink-jet recording head. Of these many methods, in particular, a method of discharging small ink droplets to record a high resolution image can receive great advantages of the invention. Accordingly, in exemplary embodiments of the present invention, the recording head can have a large number of densely disposed recording elements each including an electro-thermal transducer element.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-218725 filed Jul. 28, 2005, which is hereby incorporated by reference herein in its entirety.

What is claimed is:

1. An image processing method for generating density signals corresponding to at least achromatic dots and second kind chromatic dots, the second kind chromatic dots being in the same color as or a similar color to first kind chromatic dots and having a smaller size or a lower density than the first kind chromatic dots, the method comprising:
    performing image processing to generate at least density signals corresponding to the achromatic dots and the second kind chromatic dots respectively for forming a monochrome image, the density signals being generated, based on a luminance signal corresponding to the monochrome image, so that the density signal corresponding to the achromatic dots has a larger value than the density signal corresponding to the second kind chromatic dots in an entire range of the luminance signal.

2. The image processing method according to claim 1, wherein performing image processing includes generating the density signal corresponding to the second kind chromatic dots at least in a part of the entire range of the luminance signal.

3. The image processing method according to claim 1, wherein performing image processing includes generating density signals corresponding to the achromatic dots, the first kind chromatic dots, and the second kind chromatic dots respectively.

4. The image processing method according to claim 3, wherein performing image processing includes generating the density signals so that the density signal corresponding to the achromatic dots has a larger value than the density signal corresponding to each of the first kind chromatic dots and the second kind chromatic dots in the entire range of the luminance signal.

5. The image processing method according to claim 4, wherein performing image processing includes generating the density signal corresponding to the second kind chromatic dots at least in a part of the entire range of the luminance signal, and generating the density signal corresponding to the first kind chromatic dots at least in a part of the entire range of the luminance signal.

6. The image processing method according to claim 1, wherein the second kind chromatic dots have the same color as that of the first kind chromatic dots and a smaller size than that of the first kind chromatic dots.

7. The image processing method according to claim 6, wherein the second kind chromatic dots are one of cyan dots, magenta dots, and yellow dots.

8. The image processing method according to claim 1, wherein the second kind chromatic dots are formed using a chromatic ink of a lower color material density than that of a chromatic ink used for forming the first kind chromatic color dots.

9. An image processing apparatus comprising an image processing unit configured to perform the image processing method according to claim 1.

10. An image processing method for generating density signals corresponding to at least achromatic dots, second kind chromatic dots, and fourth kind chromatic dots, the second kind chromatic dots being in the same color as or a similar color to first kind chromatic dots and having a smaller size or a lower density than the first kind chromatic dots, the fourth kind chromatic dots being in the same color as or a similar color to third kind chromatic dots and having a smaller size or a lower density than the third kind chromatic dots, the third kind chromatic dots having a color different from that of the first kind chromatic dots, the method comprising:
    performing image processing to generate at least density signals corresponding to the achromatic dots, the second kind chromatic dots, and the fourth kind chromatic dots respectively for forming a monochrome image, the density signals being generated, based on a luminance signal corresponding to the monochrome image, so that the density signal corresponding to the achromatic dots has a larger value than the density signal corresponding to each of the second and fourth kind chromatic dots in an entire range of the luminance signal.

11. The image processing method according to claim 10, wherein performing image processing includes generating the density signal corresponding to the second kind chromatic dots at least in a part of the entire range of the luminance signal, and generating the density signal corresponding to the fourth kind chromatic dots at least in a part of the entire range of the luminance signal.

12. The image processing method according to claim 10, wherein a combination of the second kind chromatic dots and the fourth kind chromatic dots is one of a combination of cyan dots and magenta dots, a combination of cyan dots and yellow dots, and a combination of magenta dots and yellow dots.

13. An image processing method for generating density signals corresponding to at least achromatic dots, second kind chromatic dots, and third kind chromatic dots, the second kind chromatic dots being in the same color as or a similar color to first kind chromatic dots and having a smaller size or a lower density than the first kind chromatic dots, the third kind chromatic dots having a color different from that of the second kind chromatic dots, the method comprising:

performing image processing to generate density signals corresponding to the achromatic dots, the second kind chromatic dots, and the third kind chromatic dots respectively for forming a monochrome image, the density signals generated, based on the luminance signal corresponding to the monochrome image, so that the density signal corresponding to the achromatic dots has a larger value than the density signal corresponding to each of the second and third kind chromatic dots in an entire range of the luminance signal.

14. The image processing method according to claim 13, wherein the second kind chromatic dots are one of cyan dots and magenta dots, and the third kind chromatic dots are yellow dots.

15. An image processing method for generating a signal for image formation performed in a recording apparatus capable of recording at least achromatic dots, first kind chromatic dots, second kind chromatic dots, and third kind chromatic dots, the second kind chromatic dots being in the same color as or a similar color to the first kind chromatic dots and having a smaller size or a lower density than the first kind chromatic dots, the third kind chromatic dots having a color different from that of the second kind chromatic dots, the method comprising:

specifying one of a first monochrome mode and a second monochrome mode to form an image in monochrome;

when the first monochrome mode is specified, performing image processing to generate at least density signals corresponding to the achromatic dots and the second kind chromatic dots respectively for forming the monochrome image, the density signals being generated, based on the luminance signal corresponding to the monochrome image, so that the density signal corresponding to the achromatic dots has a larger value than the density signal corresponding to the second kind chromatic dots in an entire range of the luminance signal; and when the second monochrome mode is specified, performing image processing to generate at least density signals corresponding to the achromatic dots and the third kind chromatic dots respectively for forming the monochrome image, the density signals being generating, based on the luminance signal corresponding to the monochrome image, so that the density signal corresponding to the achromatic dots has a larger value than the density signal corresponding to the third kind chromatic dots in the entire range of the luminance signal.

16. An image processing method for generating a signal for image formation performed in a recording apparatus capable of recording at least a chromatic dots, first kind chromatic dots, second kind chromatic dots, third kind chromatic dots, fourth kind chromatic dots, and fifth kind chromatic dots, the second kind chromatic dots being in the same color as or a similar color to the first kind chromatic dots and having a smaller size or a lower density than the first kind chromatic dots, the third kind chromatic dots having a color different from that of the first kind chromatic dots, the fourth kind chromatic dots being in the same color as or a similar color to the third kind chromatic dots and having a smaller size or a lower density than the third kind chromatic dots, the fifth kind chromatic dots having a color different from those of the first and third kind chromatic dots, the method comprising:

specifying one of a first monochrome mode and a second monochrome mode to form an image in monochrome;

when the first monochrome mode is specified, performing image processing to generate at least density signals corresponding to the achromatic dots, the second kind chromatic dots, and the fourth kind chromatic dots respectively for forming the monochrome image, the density signals being generated, based on the luminance signal corresponding to the monochrome image, so that the density signal corresponding to the achromatic dots has a larger value than the density signal corresponding to each of the second and fourth kind chromatic dots in an entire range of the luminance signal; and when the second monochrome mode is specified, performing image processing to generate, based on a luminance signal corresponding to an image to be formed, at least density signals corresponding to the achromatic dots, the second kind chromatic dots, and the fifth kind chromatic dots respectively for forming the monochrome image, the density signals being generated, based on the luminance signal corresponding to the monochrome image, so that the density signal corresponding to the achromatic dots has a larger value than the density signal corresponding to each of the second and fifth kind chromatic dots in the entire range of the luminance signal.

17. The image processing method according to claim 16, wherein specifying one of the first monochrome mode and the second monochrome mode includes specifying one of the first monochrome mode and the second monochrome mode depending on a type of a recording medium used for forming the image.

18. The image processing method according to claim 16, wherein specifying one of the first monochrome mode and the second monochrome mode includes specifying one of the first monochrome mode and the second monochrome mode depending on an instruction from a user.

19. An image processing method for generating a signal for image formation performed in a recording apparatus capable of recording at least black dots, first cyan dots, second cyan dots, first magenta dots, second magenta dots, and yellow dots, the second cyan dots having a recording density lower than that of the first cyan dots, the second magenta dots having a recording density lower than that of the first magenta dots, the method comprising:

performing image processing to generate, based on a luminance signal corresponding to an image to be formed, at least density signals corresponding to the black dots and the second cyan dots respectively for forming a monochrome image, the density signals being generated, based on the luminance signal corresponding to the monochrome image, so that the density signal corresponding to the black dots has a larger value than the density signal corresponding to the second cyan dots in an entire range of the luminance signal.

20. The image processing method according to claim 19, wherein the second cyan dots are formed using a light cyan ink having a color material density lower than that of a cyan ink used for forming the first cyan dots, and the second magenta dots are formed using a light magenta ink having a color material density lower than that of a magenta ink used for forming the first magenta dots.

21. An image processing method for generating a signal for image formation performed in a recording apparatus capable of recording at least black dots, first cyan dots, second cyan dots, first magenta dots, second magenta dots, and yellow dots, the second cyan dots having a recording density lower than that of the first cyan dots, the second magenta dots having a recording density lower than that of the first magenta dots, the method comprising:

performing image processing to generate density signals corresponding to the black dots, the second cyan dots, and the second magenta dots respectively for forming a monochrome image, the density signals generated, based on the luminance signal corresponding to the monochrome image, so that the density signal corresponding to the black dots has a larger value than the density signal corresponding to each of the second cyan dots and the second magenta dots in an entire range of the luminance signal.

22. The image processing method according to claim 21, wherein the size of the second cyan dots is smaller than that of the first cyan dots, and the size of the second magenta dots is smaller than that of the first magenta dots.

23. An image processing method for generating a signal for image formation performed in a recording apparatus capable of recording at least black dots, first cyan dots, second cyan dots, first magenta dots, second magenta dots, and yellow dots, the second cyan dots having a recording density lower than that of the first cyan dots, the second magenta dots having a recording density lower than that of the first magenta dots, the method comprising:

performing image processing to generate density signals corresponding to the black dots, the second cyan dots, and the yellow dots respectively for forming a monochrome image, the density signals generated, based on the luminance signal corresponding to the monochrome image, so that the density signal corresponding to the black dots has a larger value than the density signal corresponding to each of the second cyan dots and the yellow dots in an entire range of the luminance signal.

24. An image processing method for generating a signal for image formation performed in a recording apparatus capable of recording at least black dots, first cyan dots, second cyan dots, first magenta dots, second magenta dots, and yellow dots, the second cyan dots having a recording density lower than that of the first cyan dots, the second magenta dots having a recording density lower than that of the first magenta dots, the method comprising:

performing image processing to generate, based on a luminance signal corresponding to an image to be formed, at least density signals corresponding to the black dots and the second magenta dots respectively for forming a monochrome image, the density signals generated, based on the luminance signal corresponding to the monochrome image, so that the density signal corresponding to the black dots has a larger value than the density signal corresponding to the second magenta dots in an entire range of the luminance signal.

25. An image processing method for generating a signal for image formation performed in a recording apparatus capable of recording at least black dots, first cyan dots, second cyan dots, first magenta dots, second magenta dots, and yellow dots, the second cyan dots having a recording density lower than that of the first cyan dots, the second magenta dots having a recording density lower than that of the first magenta dots, the method comprising:

performing image processing to generate density signals corresponding to the black dots, the second magenta dots, and the yellow dots respectively for forming a monochrome image, the density signals generated, based on the luminance signal corresponding to the monochrome image, so that the density signal corresponding to the black dots has a larger value than the density signal corresponding to each of the second magenta dots and the yellow dots in an entire range of the luminance signal.

* * * * *